US009532400B2

(12) United States Patent
Schmidt et al.

(10) Patent No.: US 9,532,400 B2
(45) Date of Patent: Dec. 27, 2016

(54) RADIO COMMUNICATION DEVICES AND CELLULAR WIDE AREA RADIO BASE STATION

(71) Applicant: INTEL DEUTSCHLAND GMBH, Neubiberg (DE)

(72) Inventors: Andreas Schmidt, Braunschweig (DE); Maik Bienas, Braunschweig (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 231 days.

(21) Appl. No.: 13/779,835

(22) Filed: Feb. 28, 2013

(65) Prior Publication Data

US 2014/0243038 A1 Aug. 28, 2014

(51) Int. Cl.
| | |
|---|---|
| *H04W 88/10* | (2009.01) |
| *H04W 76/02* | (2009.01) |
| *H04W 76/04* | (2009.01) |
| *H04W 4/22* | (2009.01) |

(52) U.S. Cl.
CPC ............... *H04W 88/10* (2013.01); *H04W 4/22* (2013.01); *H04W 76/023* (2013.01); *H04W 76/043* (2013.01)

(58) Field of Classification Search
CPC .... H04W 76/023; H04W 48/16; H04W 48/08; H04W 76/02; H04W 56/001; H04W 76/043; H04W 92/18
USPC ....................................................... 455/435.1
See application file for complete search history.

(56) References Cited

U.S. PATENT DOCUMENTS

| | | | |
|---|---|---|---|
| 2010/0261469 A1 | 10/2010 | Ribeiro et al. | |
| 2011/0098043 A1* | 4/2011 | Yu et al. ................... | 455/435.1 |
| 2011/0103317 A1* | 5/2011 | Ribeiro et al. ............ | 370/329 |
| 2011/0317569 A1* | 12/2011 | Kneckt et al. ............ | 370/252 |
| 2012/0207040 A1* | 8/2012 | Comsa .............. | H04W 72/1215 |
| | | | 370/252 |

FOREIGN PATENT DOCUMENTS

WO     2004077917 A2     9/2004

OTHER PUBLICATIONS

3GPP TSG-SA WG1 Meeting #56 San Francisco, CA, Nov. 14-18, 2011 Contribution S1-113015.*
3GPP TS 36.331 Radio Resource Control (RRC); Protocol specification (Release 10).*
European Patent Office; International Search Report and Written Opinion for PCT App. No. PCT/EP2014/050843, mailed Jul. 23, 2014; 8 pages.

(Continued)

*Primary Examiner* — Vladimir Magloire
*Assistant Examiner* — Ernest Tacsik
(74) *Attorney, Agent, or Firm* — Schwabe, Williamson & Wyatt, P.C.

(57) ABSTRACT

A radio communication terminal device may include: a cellular wide area radio communication technology circuit configured to provide a communication according to a cellular wide area radio communication technology; a circuit configured to provide a direct communication device to communication device communication; and a message generator configured to generate a message comprising information of a direct communication device to communication device communication provided by the circuit.

15 Claims, 15 Drawing Sheets

(56) References Cited

OTHER PUBLICATIONS

3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 10); pp. 1-194.

3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification; (Release 10); pp. 1-302.

3GPP TS 36.101 V10.6.0 (Mar. 2012); 3rd Generation Partnership Project; Technical Specification Group Radio Access Network; Evolved Universal Terrestrial Radio Access (E-UTRA); User Equipment (UE) radio transmission and reception (Release 10); pp. 1-312.

3GPP TR 22.803 V0.3.0 (May 2012) 3rd Generation Partnership Project; Technical Specification Group SA; Feasibility Study for Proximity Services (ProSe) (Release 12); pp. 1-24.

3GPP TS 36.306 V10.1.0 (Mar. 2011); 3rd Generation Partnership Project; Technical Specification Group Radio Access Network; Evolved Universal Terrestrial Radio Access (E-UTRA); User Equipment (UE) radio access capabilities; (Release 10); pp. 1-18.

3GPP TS 36.304 V10.5.0 (Mar. 2012); 3rd Generation Partnership Project; Technical Specification Group Radio Access Network; Evolved Universal Terrestrial Radio Access (E-UTRA); User Equipment (UE) procedures in idle mode (Release 10); pp. 1-33.

3GPP TS 36.321 V10.5.0 (Mar. 2012); 3rd Generation Partnership Project; Technical Specification Group Radio Access Network; Evolved Universal Terrestrial Radio Access (E-UTRA); Medium Access Control (MAC) protocol specification (Release 10); pp. 1-54.

3GPP TR 22.803 V1.0.0 (Aug. 2012) 3rd Generation Partnership Project; Technical Specification Group SA; Feasibility Study for Proximity Services (ProSe) (Release 12); pp. 1-33.

3GPP TS 36.306 V9.2.0 (Jun. 2010); 3rd Generation Partnership Project; Technical Specification Group Radio Access Network; Evolved Universal Terrestrial Radio Access (E-UTRA); User Equipment (UE) radio access capabilities (Release 9); pp. 1-16.

\* cited by examiner

RADIO COMMUNICATION DEVICES AND CELLULAR WIDE AREA RADIO BASE STATION

TECHNICAL FIELD

Various aspects of this disclosure relate generally to radio communication devices and to a cellular wide area radio base station.

BACKGROUND

3GPP (Third Generation Partnership Project) is currently in a process of studying use cases and identifying potential requirements for operator controlled discovery of and direct communication between mobile devices that are in close proximity. This activity is commonly known as "ProSe" (Proximity Services). It is expected that the corresponding technical stage 2 work on this topic starts soon when work on 3GPP Rel-12 begins. Possible use cases for direct UE-to-UE communication are for example: commercial use, social use, network offloading, UEs acting as mobile relays (e.g., for purposes such as coverage extension, mitigation of access technology mismatch, and alike), public safety, etc.

The "ProSe" topic can be divided into two parts:
Proximity Detection (this may be infrastructure assisted): This procedure determines whether given proximity criteria are fulfilled ("e.g. a UE (User Equipment) is in proximity of another UE"). The aim is twofold: to discover the proximity of two or more UEs in general and to clarify whether a direct UE-to-UE communication is possible. Criteria can be different for discovery and UE-to-UE communication.
UE-to-UE Communication (this may be under continuous control of the Mobile Network Operator (MNO)).

Direct UE-to-UE Communication is also referred to as "Device-to-Device Communication" or "D2D Communication". There are in principle two alternatives to realize such a direct communication path between mobile devices: the D2D air interface (called Ud in this description) could be realized by some type of short range technology in frequency bands different from the frequency bands used by the cellular network, such as e.g. Bluetooth or WiFi, or by re-using the LTE technology, which may be using the same frequency bands for the D2D communication as used by the cellular network.

Currently, mobile radio communication terminal devices (e.g. User Equipments (UEs)) that are engaged in some kind of direct communication device to communication device (D2D) activity (e.g. D2D-Proximity-Detection or D2D-Communication) over a so-called Ud interface in a Long Term Evolution (LTE) mobile radio communication network are not able to inform the communication network that a particular Random Access process (or a particular RRC Connection Establishment procedure) is related to a D2D activity on their side.

SUMMARY

A radio communication terminal device may include: a cellular wide area radio communication technology circuit configured to provide a communication according to a cellular wide area radio communication technology; a circuit configured to provide a direct communication device to communication device communication; and a message generator configured to generate a message including information of a direct communication device to communication device communication provided by the circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
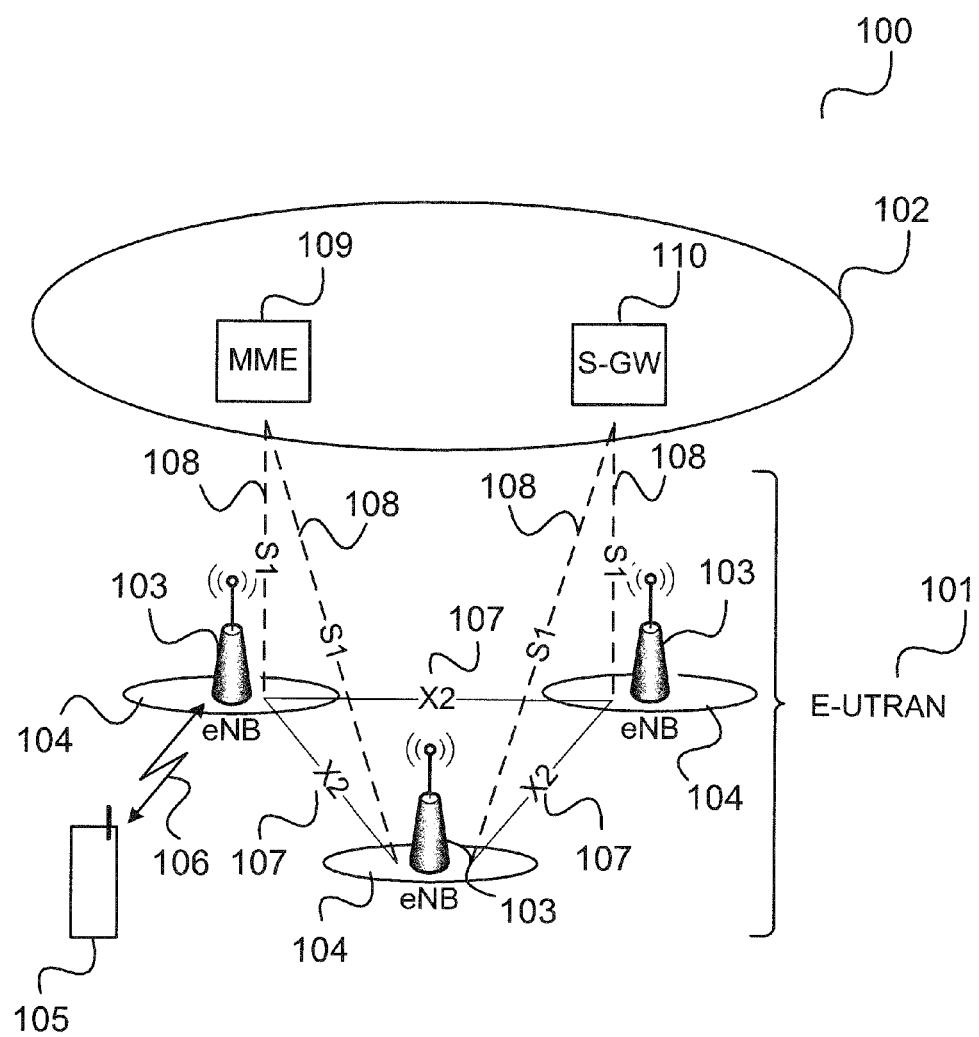
FIG. 1 shows a communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the following, a "circuit" may be understood as any kind of a logic implementing entity, which may be hardware, software, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). As will be described in more detail below, a "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit".

The terms "coupling" or "connection" are intended to include a direct "coupling" or direct "connection" as well as an indirect "coupling" or indirect "connection", respectively.

The term "protocol" is intended to include any piece of software, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. In an aspect of this disclosure, one or more communication protocol layers and its respective entities may be implemented by one or more circuits. In an aspect of this disclosure, at least two communication protocol layers may be commonly implemented by one or more circuits.

In various aspects of this disclosure, the mobile radio communication network infrastructure (in case of LTE (Long Term Evolution) including E-UTRAN (Evolved Universal Terrestrial Radio Access Network) and EPC (Evolved Packet Core)) may be informed about any communication device to communication device (which may also be referred to as D2D) communication related reasons for a particular mobile radio communication terminal device (e.g. a User Equipment (UE)) to perform Random Access (or generally speaking: for starting the RRC (Radio Resource Control) Connection Establishment procedure). These reasons may be:

The UE may want to establish an RRC Connection in order to inform the infrastructure about ongoing D2D proximity operations it is currently involved in (which may for example lead to reconfiguration of the corresponding UE).

The UE may want to establish an RRC Connection in order to inform the infrastructure about the results of D2D proximity detection (which may for example lead to context updates for a given D2D capable UE on network side).

The UE may want to establish an RRC Connection in order to request allowance to engage in D2D communication (which may for example lead to radio resource reconfiguration).

The UE may want to establish an RRC Connection in order to inform the infrastructure (e.g. entities of the communication network) about an ongoing D2D communication (which may for example lead to context updates for a given D2D cluster on communication network side).

The UE may want to establish an RRC Connection in order to seek guidance from the infrastructure (e.g. entities of the communication network) on how to continue with the direct UE-to-UE communication over the so-called Ud interface (which may for example lead to D2D reconfiguration), which will be described in more detail below.

The UE may want to establish an RRC Connection in order to request from the infrastructure a switch from direct UE-to-UE communication over the Ud interface (one air interface) to 'legacy' communication over two Uu interfaces with base station involvement (two air interfaces) which is also referred to as "session transfer". This may for example lead to an exchange of assistance data on Ud and/or Uu link quality to help the infrastructure (e.g. entities of the communication network) make such a decision.

In some implementations, the indication of a reason is purely of informative nature, while other examples will show that also a D2D related action can be requested by the UE from the communication network infrastructure side (e.g., in order to maintain or reconfigure an ongoing D2D connection).

Some use cases require a fast reaction of the infrastructure side in order to avoid a delay of service and in order to guarantee service continuity, respectively. For instance in the "communication session transfer" scenario when paging of other UEs may be provided (e.g., required, or involved), performance benefits from parallel procedures.

In some examples the indication of a reason may be detailed allowing the communication network infrastructure side to make meaningful decisions by distinguishing between "D2D for public safety" and "D2D for commercial use cases", which will be described in more detail below.

Currently, mobile radio communication terminal devices (e.g. User Equipments (UEs)) that are engaged in some kind of direct communication device to communication device (D2D) activity (e.g. D2D-Proximity-Detection or D2D-Communication) over a so-called Ud interface in a Long Term Evolution (LTE) mobile radio communication network are not able to inform the communication network that a particular Random Access process (or a particular RRC Connection Establishment procedure) is related to a D2D activity on their side. Consequently, the communication network infrastructure has no means to prioritize the incoming requests, or to prepare for D2D specific handling.

As will be described in more detail below, a radio communication terminal device (such as e.g. a User Equipment (UE)) with D2D activity may be enabled to indicate to the infrastructure the reason(s) for performing a Random Access (or generally speaking: to start an RRC Connection Establishment procedure or an RRC Connection Re-Establishment (RRC: Radio Resource Control)). New communication connection establishment causes may be introduced. Furthermore, new message parameters in an RRC connection establishment request message or in an RRC connection re-establishment request message, such as e.g. "D2D-Info-Available", "D2D-Action-Requested", "D2D-Session-Transfer", "D2D-Public-Safety" and "D2D-Commercial" are provided, as will be described in more detail below.

For reasons of simplicity, in the following, explanations will be given using LTE and the corresponding entities (e.g. E-UTRAN, EPC and UE), however, it is to be noted that various aspects may also be provided using another cellular wide area radio communication technology and its corresponding entities as will be described in more detail below.

These novel indications of a reason from the UE may be used by the infrastructure elements (E-UTRAN and EPC in case of LTE) in various ways to prepare for (some sort of related) D2D activity on the network side. One aspect of this disclosure is classification (including prioritization and de-prioritization) of incoming RRC Connection Establishment requests (or Random Access procedures) at the base station; another aspect of this disclosure is triggering distinct actions based on the indicated reasons (not necessarily restricted to the base station), such as retrieving additional pieces of information from the UE (for instance, positioning details) or from a data base (for instance, general D2D cluster policies, or D2D subscription details, or D2D UE capabilities, etc.), or triggering paging of other UEs (for instance, in case of communication session transfer).

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data stream;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109); and CSG (Closed Subscriber Group) handling.

Each base station of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
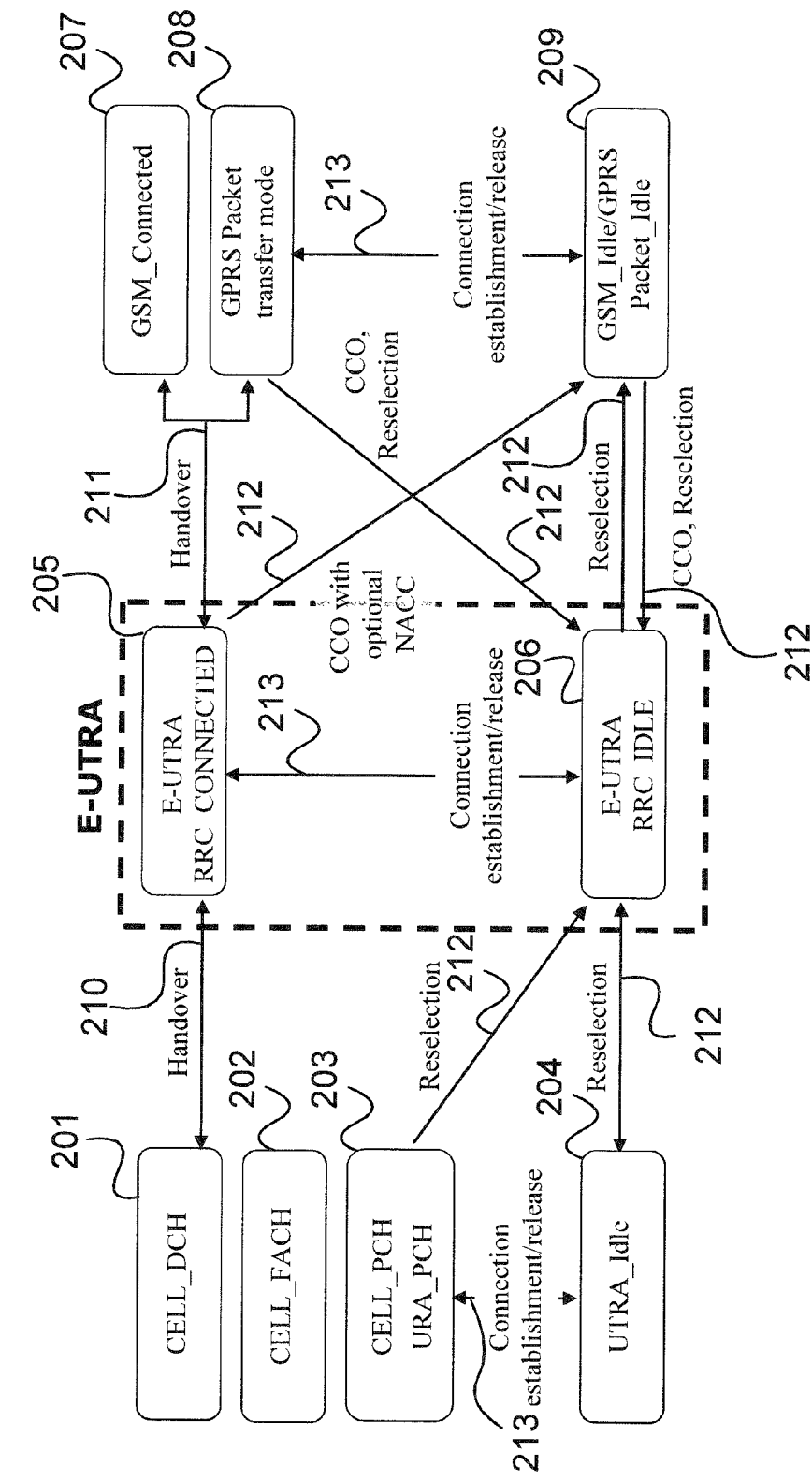
FIG. 2 shows a state diagram.

FIG. 2 shows a state diagram 200 for exemplary system in FIG. 1.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be described as follows:

RRC IDLE
  Mobile terminal specific DRX (Discontinuous Reception) may be configured by upper protocol layers;
  Mobility is controlled by the mobile terminal 105;
  The mobile terminal 105
    may acquire system information (SI);
    monitors a paging channel to detect incoming calls and SI change;
    performs neighboring cell measurements for the cell (re-)selection process.
RRC CONNECTED
A mobile terminal 105 is in RRC_CONNECTED when an RRC connection has been established.
  Transfer of unicast data to/from the mobile terminal 105;
  Mobility is controlled by the radio access network 101 (handover and cell change order);
  The mobile terminal 105 may be configured with mobile terminal specific DRX (Discontinuous Reception) at lower protocol layers.
  The mobile terminal 105
    may acquire system information (SI);
    monitors a paging channel and/or SIB (system information block) Type 1 content to detect SI change;
    monitors control channels associated with the shared data channel to determine if data is scheduled for it;
    performs neighboring cell measurements and measurement reporting to assist the network in making handover decisions;
    provides channel quality and feedback information to the radio access network 101.

According to DRX the PDCCH (Physical Downlink Control Channel) monitoring activity of the mobile terminal 105 is controlled. On the PDCCH, various RNTIs (Radio Network Temporary Identifiers) can be found.

If the mobile terminal 105 is in RRC_IDLE state it is expected to listen to the P-RNTI (the so-called paging indicator) transmitted on the PDCCH which may announce the presence of a paging message on the PDSCH. If DRX is applied in RRC_IDLE, the mobile terminal 105 only needs to monitor one Paging Occasion (PO) per DRX cycle. System Information (SI) broadcast by the base station 103 controls DRX operation by specifying a mobile terminal specific paging cycle in SIB-Type2. (It should be noted that SIB (System Information Block)-Type2 is received by all mobile terminals camping in a given radio cell, but the equation used by a mobile terminal 105 in RRC_IDLE state to calculate its individual Paging Occasion (PO) has as input variable the subscriber's (i.e. mobile terminal's) unique IMSI (International Mobile Subscriber Identity)).

If DRX is configured in RRC_CONNECTED for a mobile terminal 105, the mobile terminal 105 is allowed to monitor the PDCCH (Physical Downlink Control Channel) discontinuously (in order to save energy); otherwise the mobile terminal 105 monitors the PDCCH continuously. The RRC (Radio Resource Control) layer controls DRX operation by configuring timers and parameters, for example as shown in table 1.

TABLE 1 longDRX-CycleStartOffset
  The value of longDRX-Cycle is in number of sub-frames.
  If shortDRX-Cycle is configured, the value of longDRX-Cycle
  shall be a multiple of the shortDRX-Cycle value. The value of
  drxStartOffset value is in number of sub-frames.
onDurationTimer
  The value in number of PDCCH sub-frames.
drx-InactivityTimer
  The value in number of PDCCH sub-frames.
drx-RetransmissionTimer
  The value in number of PDCCH sub-frames.
shortDRX-Cycle
  The value in number of sub-frames.
drxShortCycleTimer
  The value in multiples of shortDRX-Cycle.

Figure 3:
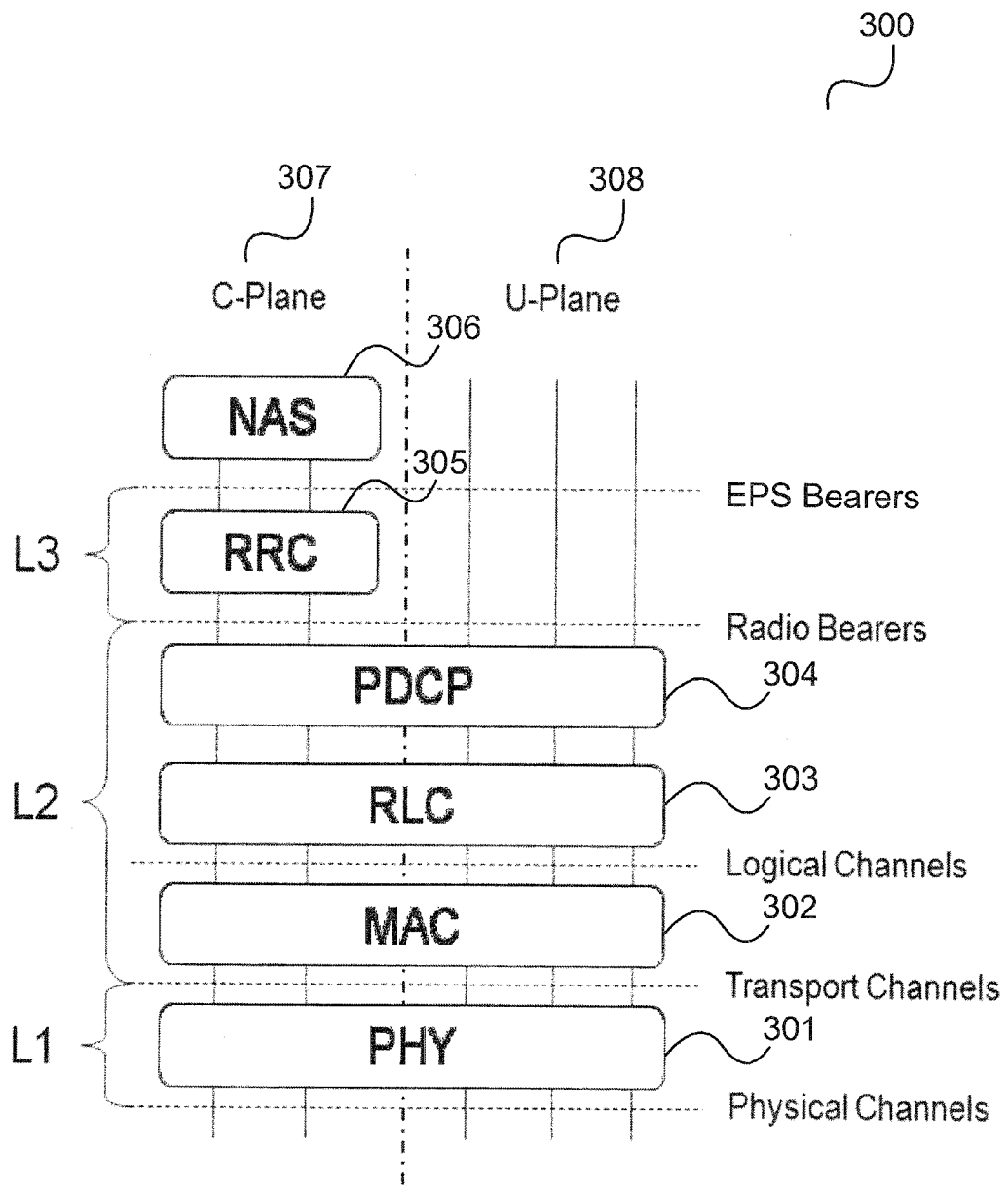
FIG. 3 shows a protocol structure.

The protocols for the C-Plane and the U-Plane of the E-UTRAN 101 according to LTE are illustrated in FIG. 3.

FIG. 3 shows a protocol structure 300 according to an aspect of this disclosure.

The LTE air interface (also referred to as Uu interface) is logically divided into three protocol layers. The entities ensuring and providing the functionality of the respective protocol layers are implemented both in the mobile terminal 105 and the base station 103. The bottommost layer is the physical layer (PHY) 301, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 302, the Radio Link Control (RLC) sublayer 303 and the Packet Data Convergence Protocol (PDCP) sublayer 304. The topmost layer of the Uu air interface is the network layer, which is the protocol layer 3 (L3) according to the OSI reference model and consists of the Radio Resource Control (RRC) layer 305 on the C-Plane 307. On the C-Plane 307, there is further the NAS (Non-Access Stratum) protocol layer 306.

Each protocol layer 301 to 306 provides the protocol layer above it with its services via defined service access points (SAPs). To provide a better understanding of the protocol layer architecture, the SAPs were assigned unambiguous names: The PHY 301 provides its services to the MAC layer 302 via transport channels, the MAC layer 302 provides its services to the RLC layer 303 via logical channels, and the RLC layer 303 provides its services to the RRC layer 305 and the PDCP layer 304 as data transfer as function of the RLC mode, i.e. TM (Transparent Mode), UM (Unacknowledged Mode) and AM (Acknowledged Mode). Further, the PDCP layer 304 provides its services to the RRC layer 305 and the U-Plane 308 upper layers via radio bearers, specifically as Signaling Radio Bearers (SRB) to the RRC 305 and as Data Radio Bearers (DRB) to the U-Plane 308 upper layers. According to LTE a maximum of 3 SRBs and 8 DRBs is currently supported.

The radio protocol architecture is not just split horizontally into the above-described protocol layers; it is also split vertically into the "control plane" (C-Plane) 307 and the "user plane" (U-Plane) 308. The entities of the control plane 307 are used to handle the exchange of signaling data between the mobile terminal 105 and the base station 103, which are required among other for the establishment, reconfiguration and release of physical channels, transport channels, logical channels, signaling radio bearers and data radio bearers, whereas the entities of the user plane 308 are used to handle the exchange of user data between the mobile terminal 105 and the base station 103. According to one aspect of this disclosure, according to LTE, each protocol layer has particular prescribed functions:

The PHY layer 301 is primarily responsible for i) error detection on the transport channel; ii) channel encoding/decoding of the transport channel; iii) Hybrid ARQ soft combining; iv) mapping of the coded transport channel onto physical channels; v) modulation and demodulation of physical channels.

The MAC layer 302 is primarily responsible for i) mapping between logical channels and transport channels; ii) error correction through HARQ; iii) logical channel prioritization; iv) transport format selection.

The RLC layer 303 is primarily responsible for i) error correction through ARQ, ii) concatenation, segmentation and reassembly of RLC SDUs (Service Data Unit); iii) re-segmentation and reordering of RLC data PDUs (Protocol Data Unit). Further, the RLC layer 303 is modeled such that there is an independent RLC entity for each radio bearer (data or signaling).

The PDCP layer 304 is primarily responsible for header compression and decompression of IP (Internet Protocol) data flows, ciphering and deciphering of user plane data and control plane data, and integrity protection and integrity verification of control plane data. The PDCP layer 304 is modeled such that each RB (i.e. DRB and SRB, except for SRB0) is associated with one PDCP entity. Each PDCP entity is associated with one or two RLC entities depending on the RB characteristic (i.e. uni-directional or bi-directional) and RLC mode.

The RRC layer 305 is primarily responsible for the control plane signaling between the mobile terminal 105 and the base station 103 and performs among other the following functions: i) broadcast of system information, ii) paging, iii) establishment, reconfiguration and release of physical channels, transport channels, logical channels, signaling radio bearers and data radio bearers. Signaling radio bearers are used for the exchange of RRC messages between the mobile terminal 105 and the base station 103.

Figure 4:
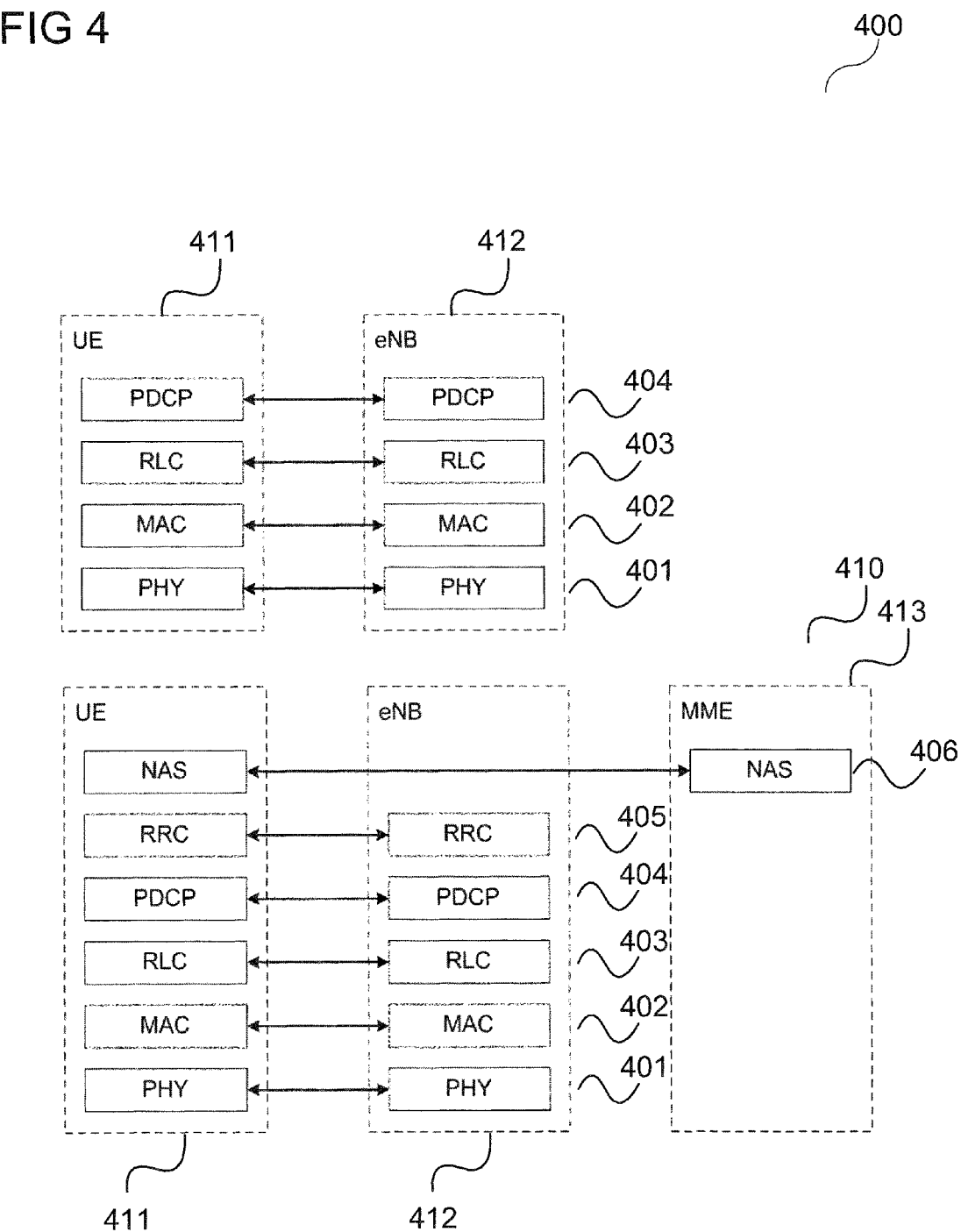
FIG. 4 shows a first protocol structure and a second protocol structure.

Differences between the C-Plane (control plane) 307 and the U-Plane (user plane) 308 according to E-UTRA (LTE) technology are depicted in FIG. 4. The RRC protocol and all lower layer protocols (PDCP, RLC, MAC, and PHY) terminate in the eNB, while the NAS protocol layer 306 terminates in the MME 109 in the EPC 102.

FIG. 4 shows a first protocol structure 400 and a second protocol structure 410.

The first protocol structure 400 corresponds to the U-Plane and the second protocol structure 410 corresponds to the C-Plane.

Analogously to the illustration as shown in FIG. 3, the protocol structures 400, 410 include a physical layer 401, a MAC layer 402, an RLC (Radio Link Control) layer 403, a PDCP layer 404, an RRC layer 405, and a NAS (Non-Access Stratum) protocol layer 406.

In the physical layer 401, the MAC layer 402, the RLC layer 403, the PDCP layer 404, and the RRC layer 405 the terminal points of the communication are the mobile terminal (UE) 411 and the base station (eNB) 412.

In the NAS protocol layer 406, the terminal points of the communication are the UE 411 and the MME 413.

With LTE the UMTS air interface is further optimized for packet data transmission by improving the system capacity and the spectral efficiency. However, the enhancements for LTE technology are not restricted to the air interface. The core network architecture for 3GPP's LTE wireless communication standard is also enhanced. This endeavor is commonly known as SAE (System Architecture Evolution).

SAE refers to the evolution of the GPRS Core Network, with some differences:
simplified architecture;
all IP (Internet protocol) Network (AIPN);
support for higher throughput and lower latency radio access networks (RANs);
support for, and mobility between, multiple heterogeneous RANs, including legacy systems as GPRS, but also non-3GPP systems (e.g. WiMAX);

According to the SAE architecture, the main component is the Evolved Packet Core (e.g. forming the core network of the communication system 100 illustrated in FIG. 1). The Evolved Packet Core (EPC) includes:

A Mobility Management Entity (MME): The MME is the key control-node for the LTE radio access network (E-UTRAN) and, according to LTE, holds the following functions:
NAS signaling;
NAS signaling security;
AS (Access Stratum) Security control;
Inter CN (Core Network) node signaling for mobility between 3GPP access networks;
Idle mode UE Reachability (including control and execution of paging retransmission);
Tracking Area List (TAL) management (for UE in idle and active mode);
PDN GW (Packet Data Network Gateway) and Serving GW selection;
MME selection for handovers with MME change;
SGSN (Serving GPRS (General Packet Radio System) Support Node) selection for handovers to 2G or 3G 3GPP access networks;
Roaming;
Authentication;
Bearer management functions including dedicated bearer establishment;
Support for PWS (which includes ETWS and CMAS) message transmission;
Optionally performing paging optimization.

A Serving Gateway (S-GW): The S-GW holds, according to LTE, the following functions:
The local Mobility Anchor point for inter-eNB handover;
Mobility anchoring for inter-3GPP mobility;
E-UTRAN idle mode downlink packet buffering and initiation of network triggered service request procedure;
Lawful Interception;
Packet routing and forwarding;
Transport level packet marking in the uplink and the downlink;
Accounting on user and QCI (QoS (Quality of Service) Class Identifier) granularity for inter-operator charging;

Uplink and Downlink charging per UE, PDN, and QCI.

A PDN Gateway (P-GW): According to LTE, the PDN Gateway provides connectivity from the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful Interception and packet screening. Another key role of the P-GW is to act as the anchor for mobility between 3GPP and non-3GPP technologies such as WiMAX and 3GPP2 (CDMA 1× and EvDO (Evolution Data Optimized)).

In the following, the network architecture of a communication system (e.g. a 3GPP communication system) with three different Radio Access Networks (RANs) is described with reference to FIG. 5 (for the non-roaming case).

Figure 5:
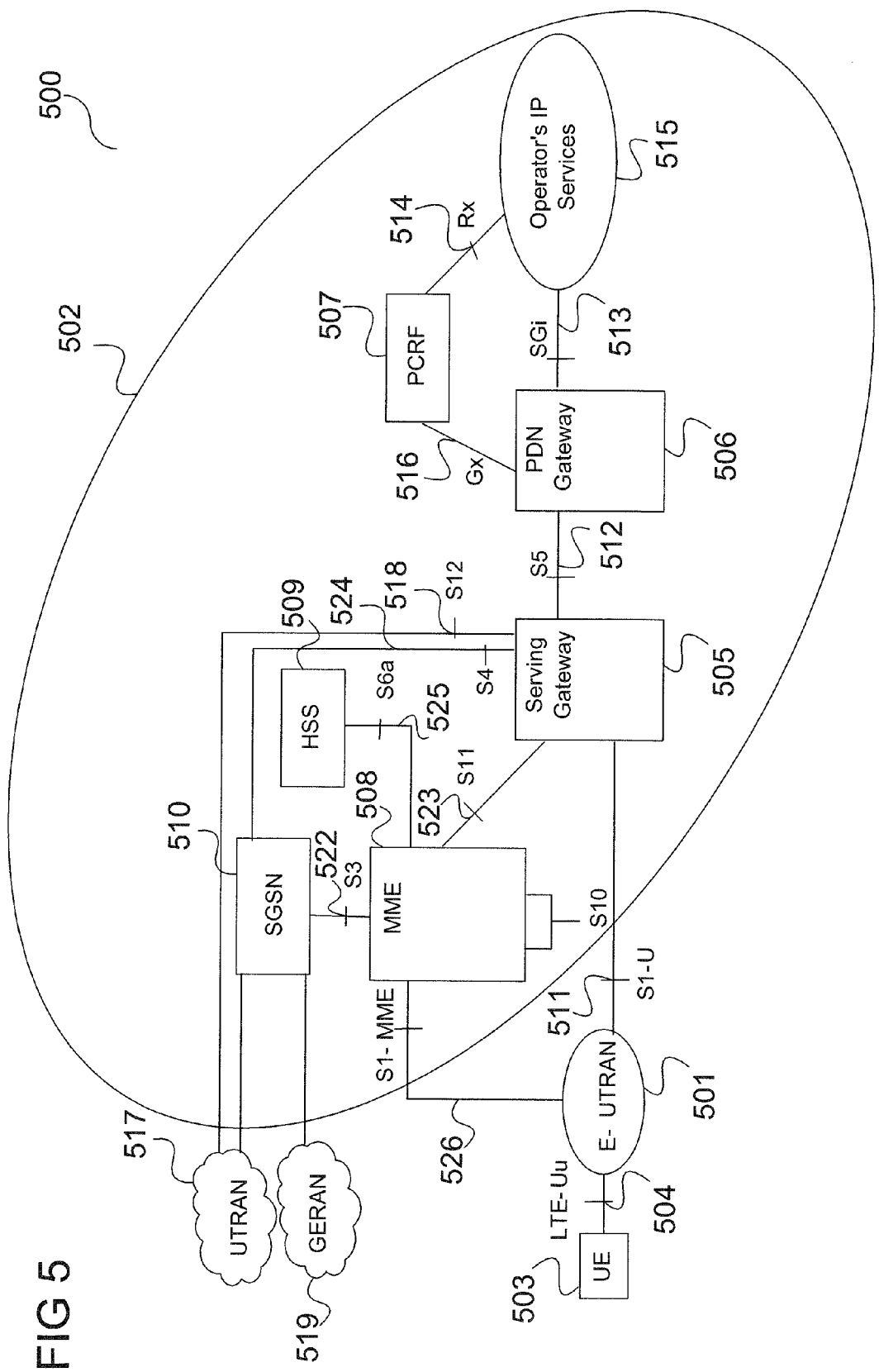
FIG. 5 shows a communication system in more detail.

FIG. 5 shows a communication system 500 according to an aspect of this disclosure.

The communication system 500 includes an E-UTRAN 501 and a core network 502.

The communication system 500 corresponds to the communication system 100 wherein in FIG. 1, the E-UTRAN 101, 501 is shown in higher detail while in FIG. 5, the core network 102, 502 is shown in higher detail.

A mobile terminal 503 which may correspond to the mobile terminal 105 may connect to the E-UTRAN 501 by means of an air interface (Uu interface) 504.

The core network 502 includes a Serving Gateway 505, a PDN (Packet Data Network) Gateway 506, a PCRF (Policy and Charging Rules Function) 507, an MME (Mobility Management Entity) 508, and a HSS (Home Subscriber Server) 509, an SGSN (Serving GPRS (General Packet Radio Service) Support Node) 510.

The E-UTRAN 501 exchanges information or commands with the Serving Gateway 505 by means of an S1-U interface 511. The Serving Gateway 505 is coupled to the PDN Gateway 506 by means of an S5 interface 512. The PDN Gateway 506 and the PCRF 507 may access IP (Internet Protocol) services 515 (i.e. may access, for example, corresponding servers) provided by the operator of the mobile communication system 500 by means of an SGi interface 513 and an Rx interface 514, respectively.

The PCRF 507 is coupled to the PDN Gateway 506 by means of a Gx interface 516. The Serving Gateway 505 is coupled by means of an S4 interface 524 with the SGSN 510. The Serving Gateway 505 may further be coupled to an UTRAN (i.e. a radio access network according to UMTS) 517 via a S12 interface 518. The MME 508 is coupled by means of an S6a interface 525 with the HSS 509. The MME 508 is further coupled by means of an S1-MME interface 526 to the E-UTRAN 501.

The SGSN 510 may support legacy access to the UTRAN 517 and/or a GERAN (GSM (Global System for Mobile Communications) EDGE (Enhanced Data Rates for GSM Evolution) Radio Access Network) 519. The SGSN 510 is coupled with the MME 508 via an S3 interface 522. The Serving Gateway 505 is coupled with the MME 508 via an S11 interface 523.

GERAN is also referred to as 2G and 2.5G. UTRAN is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN includes at least one NodeB (i.e. a UMTS base station) that is connected to at least one Radio Network Controller (RNC). An RNC provides control functionalities for one or more NodeBs. A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

The E-UTRAN 501 is the 3GPP Radio Access Network for LTE (3.9G) that is currently being worked on. The E-UTRA air interface uses OFDMA for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with up to four antennas per (base and user) station. The use of OFDM enables E-UTRA to be much more flexible in its use of spectrum than the older CDMA based systems, such as UTRAN. OFDM has a link spectral efficiency greater than CDMA, and when combined with modulation formats such as 64QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

Figure 6:
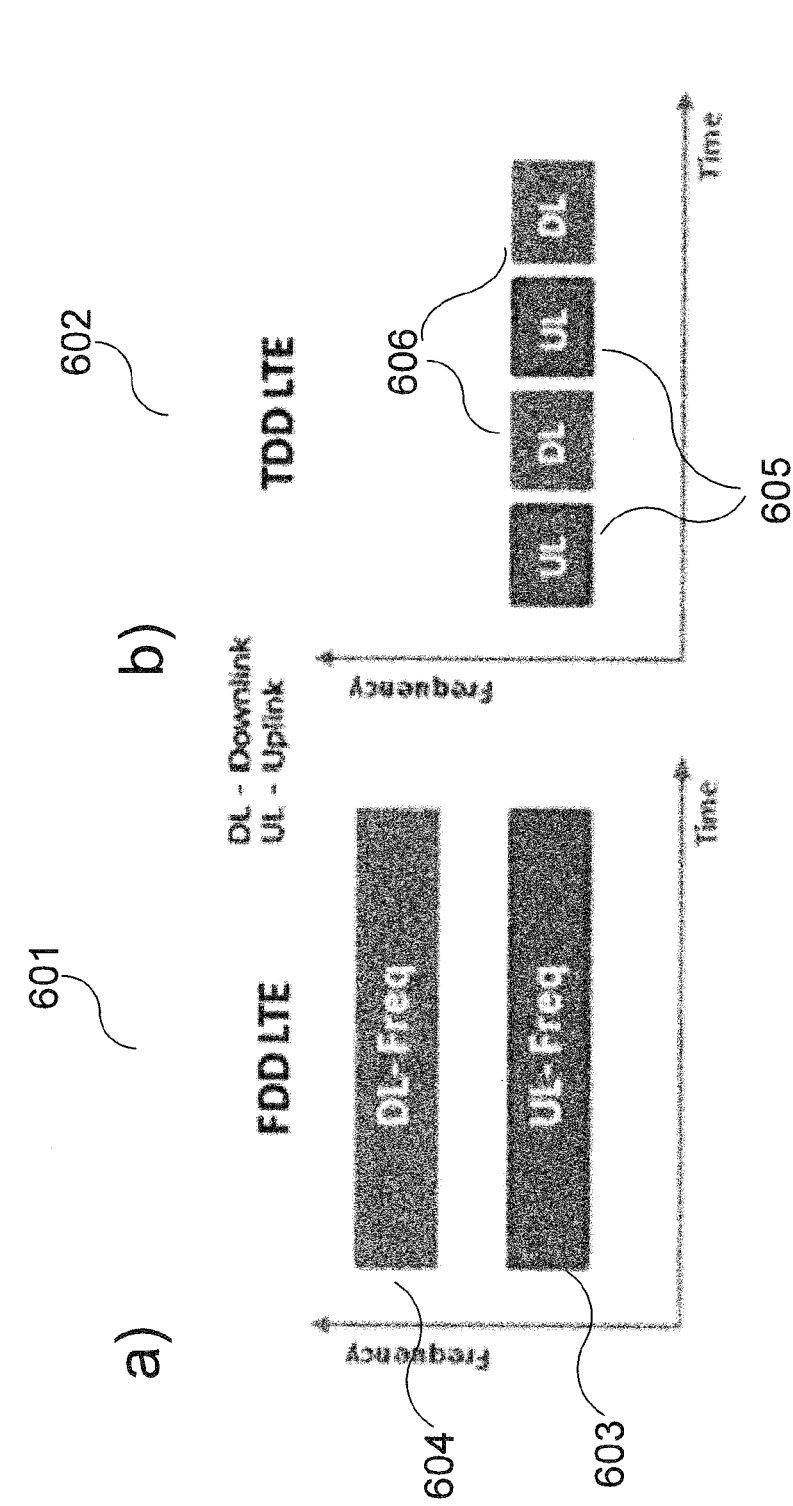
FIGS. 6a and 6b show diagrams illustrating the principles of two duplex methods.

FIG. 6a and FIG. 6b show diagrams illustrating the frequency spectrum described by 3GPP LTE specification. FIG. 6a shows a diagram 601 illustrating the use of Frequency Division Duplexing (FDD). FIG. 6b shows a diagram 602 illustrating the use of Time Division Duplexing (TDD) to separate uplink (UL) and downlink (DL) traffic. Frequency Division Duplexing (FDD) uses for uplink and downlink a paired spectrum with two distinct frequency bands 603, 604. The downlink frequency band 603 is separated from the uplink frequency band 604. Time Division Duplexing (TDD) uses alternating resource portions for Uplink 605 and Downlink 606 in the same frequency band. According to one aspect of this disclosure, Time Division Duplexing (TDD) may use alternating uplink portions 605 and downlink portions 606 in the same frequency band as used by the uplink frequency band in the Frequency Division Duplexing (FDD) shown in FIG. 6a. According to another aspect of this disclosure, the frequency band used for the alternating uplink portions 605 and downlink portions 606 may be the same frequency band as used by the downlink frequency band in the Frequency Division Duplexing (FDD).

Figure 7:
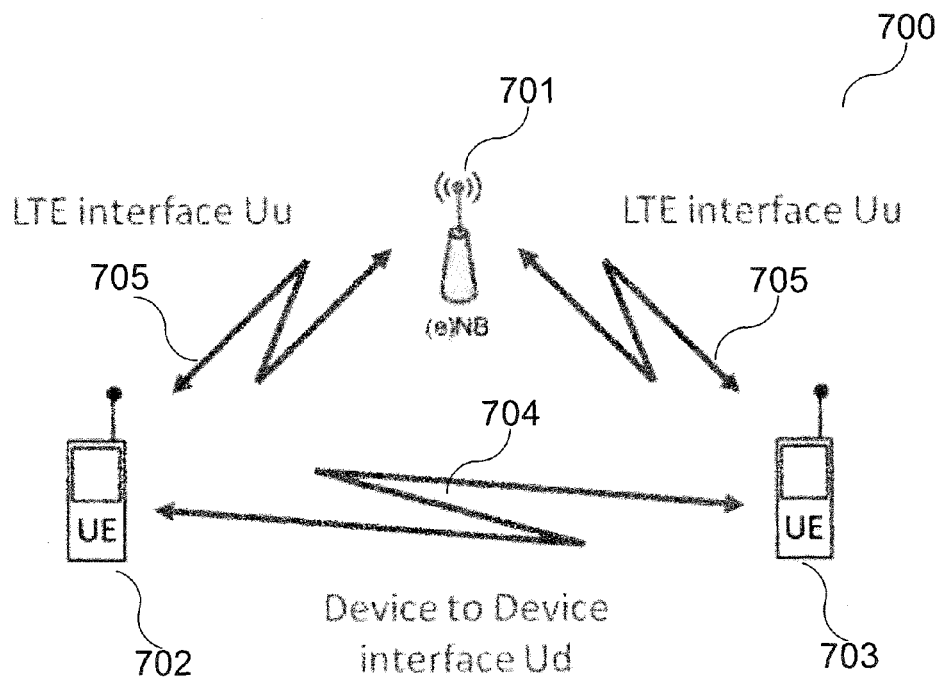
FIG. 7 shows a communication system.

FIG. 7 shows a communication system 700 with a first communication terminal device 702 (UE) and a second communication terminal device 703 (UE) having established a direct communication terminal device to communication terminal device communication connection 704 (D2D) bypassing a radio access network according to an aspect of this disclosure. A base station 701 (eNB), also referred to herein as communication device, may be part of a communication network as described with reference to FIG. 1.

Direct UE-to-UE Communication may also be referred to as "Device-to-Device Communication" or "D2D Communication". There are in principle two alternatives to realize such a direct communication path between the communication terminal devices 702, 703 (also referred to as mobile devices): a D2D air interface 704 (Ud) may be realized by some type of short range technology, such as e.g. Bluetooth or WiFi, or by re-using the LTE-TDD flavor of the LTE technology. The communication connection bypasses the base station 701.

Direct UE-to-UE Communication TDD has many benefits over FDD (by way of example, the same channel characteristics for the transmission path and reception path can be anticipated, and channel estimation using closed loop principles is not needed, etc.).

By way of example, mobile devices that are residing in coverage of an LTE-FDD cell, and that want to engage in a direct TDD-based UE-to-UE communication in one of the frequency bands of the radio cell are exposed to interference caused by traffic over the Uu interface 705 in this radio cell. At the same time the D2D traffic over the Ud interface 705 sourced by these types of D2D-UEs 702, 703 may also cause some (local) interference in the DL (downlink) or UL (uplink) band of the radio cell for other UEs being served over the Uu interface 705.

Alternatively, two UEs 702, 703 in RRC_IDLE may be camping on the same base station. At some point in time the two UEs 702, 703 may detect that they are in close proximity and that their D2D technologies (or capabilities to engage in direct UE-to-UE communication) would enable direct exchange of data over the Ud interface 704.

Figure 8:
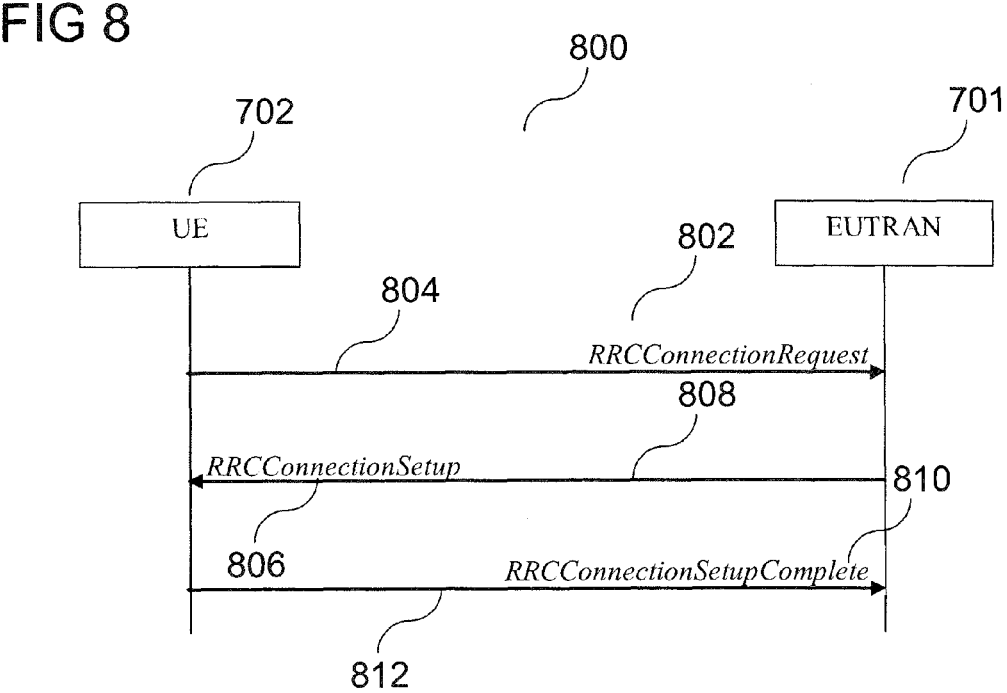
FIG. 8 shows a message flow diagram illustrating a RRC Connection Establishment procedure.

FIG. 8 shows a message flow diagram 800 illustrating Connection Establishment between a first UE 702 and the E-UTRAN (e.g. the (e)NodeB 701). This procedure is typically performed by a UE to get initial access to the infrastructure. It usually comprises Random Access.

As shown in FIG. 8, upper layer entities in the first UE 702 may initiate an RRC Connection Establishment procedure. The RRC connection establishment may involve an SRB1 (Signalling Radio Bearer 1) establishment and terminates (in the successful case) with the reception of the RRC Connection Setup Complete message on network side. In more detail, the first UE 702 may generate an RRC Connection Request message 802 and may transmit the same to the E-UTRAN (e.g. the (e)NodeB 701) in 804. Upon receipt of the RRC Connection Request message 802, the (e)NodeB 701 may generate an RRC Connection Setup message 806 and may transmit the same to the first UE 702 in 808. Furthermore, upon receipt of the RRC Connection Setup message 806, the first UE 702 may generate an RRC Connection Setup Complete message 810 and may transmit the same to the E-UTRAN (e.g. the (e)NodeB 701) in 812 to complete the establishment procedure.

Figure 9:
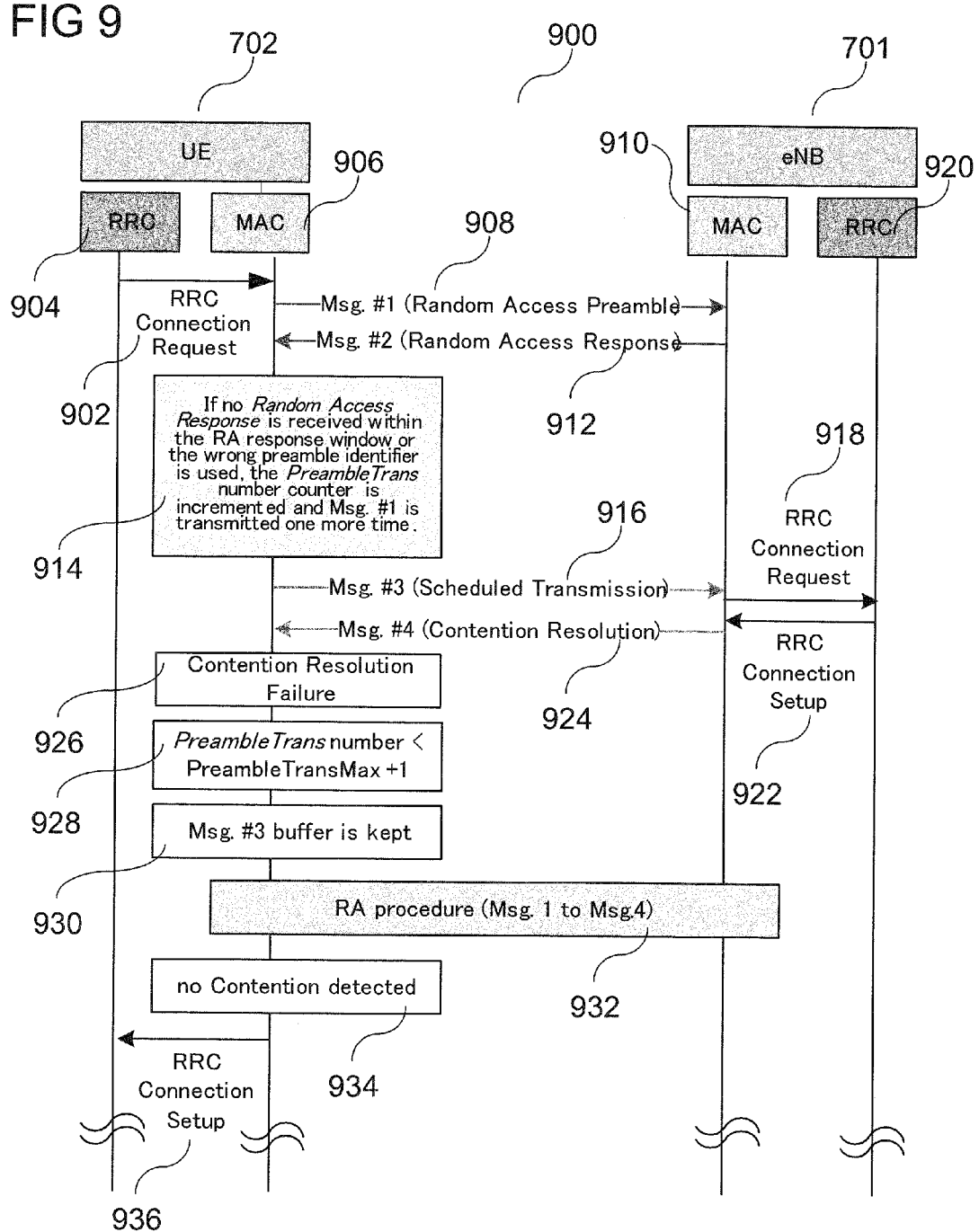
FIG. 9 shows the relationship between the RRC Connection Establishment procedure and the Random Access procedure.

The Random Access procedure, which is a MAC (Medium Access Control) procedure, is an integral part of the RRC connection establishment. RRC may control the Random Access procedure. The objective of the RRC Connection Establishment procedure is to perform a state transition from RRC_IDLE to RRC_CONNECTED. There can be several reasons for this: Traffic is generated in the UE for transmission in UL (uplink) direction (mobile originated traffic), or the UE was instructed to switch to RRC_CONNECTED by means of a preceding paging event (i.e. by previous reception of a Paging-Indicator on PDCCH followed by reception of a RRC-Paging-Message on the PDSCH). Paging may occur for instance when an event of downlink data arrival destined for this UE is detected in the EPC (mobile terminated traffic). FIG. 9 shows the relationship between the RRC Connection Establishment procedure and the Random Access procedure in the first UE 702 and in the eNodeB 701 in a further message flow diagram 900. The RRCConnectionRequest message 902 (which is transferred from an RRC entity 904 of the first UE 702 to a MAC entity 906 of the first UE 702 on the uplink CCCH (Common Control Channel) logical channel) may kick off the Random Access process on UE 702 side. In a first message (message #1) 908 a Random Access Preamble is sent to a MAC entity 910 of the (e)NodeB 701 using Random Access resources in uplink direction. Then, the Random Access Response message is generated by the MAC entity 910 on eNB 701 side and conveyed on the DL-SCH transport channel in a second message (message #2) 912. In response to this, the MAC entity 906 on UE side 702 generates and conveys in a "first scheduled transmission" in uplink direction the RRCConnectionRequest in a third message (message #3) 916. On eNB 701 side, this third message is passed on from the MAC entity 910 to the RRC entity 920 as RRCConnectionRequest message 918. The RRCConnectionRequest message 918 received by the RRC entity 920 in the eNB 701 may be of the same content as the RRCConnectionRequest message 902 submitted by the RRC entity 904 in the UE 702. The RRC entity 920 on eNB 701 side may now answer the UE by generating an RRCConnectionSetup message. The RRCConnectionSetup message 922 is typically conveyed on the downlink CCCH logical channel in a fourth message (message #4) 924. Both of these two RRC messages are transmitted via SRB0 in RLC TM (Transparent Mode), as SRB1 is usually not available at this point in time. The RRCConnectionSetup message 922 is typically sent with the intention to establish SRB1.

The UE shall set the contents of the RRCConnectionRequest message as follows:

If upper layers provide an S-TMSI (SAE—Temporary Mobile Subscriber Identity), then the UE-Identity parameter shall be set to the value received from upper layers, else the UE 702 shall draw a random value in the range 0 . . . 240-1 and set the UE-Identity to this value. Upper layers provide the S-TMSI if the UE 702 is registered in the Tracking Area (TA) of the current radio cell.

The UE (e.g. the first UE 702) shall also set the EstablishmentCause parameter according to the information received from upper layers.

The UE (e.g. the first UE 702) shall submit the RRCConnectionRequest message to lower layers (e.g. the MAC entity 906 of the UE 702) for transmission.

The UE (e.g. the first UE 702) is supposed to continue with the radio cell re-selection procedure, i.e. the UE (e.g. the first UE 702) shall perform cell re-selection related measurements as well as radio cell re-selection measurement evaluation.

Prior to the Reception of the RRCConnectionSetup message by the UE (e.g. the first UE 702), lower layer signalling (MAC signalling) may be used to allocate a C-RNTI to the UE (e.g. the first UE 702). To be more specific, the allocated C-RNTI is conveyed as part of the second message #2 (Msg. #2) 912 of the Random Access procedure, and the RRCConnectionRequest message itself is conveyed as part of a third message #3 (Msg. #3) 916 of the Random Access procedure (as shown in FIG. 9). In more detail, the MAC entity 906 of the UE 702 determines if a Random Access Response message is received from the E-UTRAN (e.g. the (e)NodeB 701). If no Random Access Response is received within an RA response window or the wrong preamble identifier is used, the PreambleTrans number counter is incremented and the first message #1 (Msg. #1) is transmitted one more time (block 914 in FIG. 9).

The Random Access procedure is a common procedure for FDD and TDD and may be performed for the following six events:

Initial access from RRC_IDLE (this is the case corresponding to FIG. 9);
RRC Connection Re-establishment;
Handover;
DL data arrival during RRC_CONNECTED requiring random access procedure (e.g., when UL synchronisation status is "non-synchronised");
UL data arrival during RRC_CONNECTED requiring random access procedure (e.g., when UL synchronisation status is "non-synchronised" or there are no PUCCH resources for SR available).
For positioning purpose during RRC_CONNECTED requiring random access procedure (e.g., when timing advance is needed for UE positioning).

Upon receipt of the scheduled transmission with the third message #3 916, the MAC entity 910 of the (e)NodeB 701 forwards an RRC Connection Request message 918 included in the third message #3 916 to the RRC entity 920 of the (e)NodeB 701. In case of a successful establishment, the RRC entity 920 of the (e)NodeB 701 may generate an RRC Connection Setup message 922 and may forward the same to the MAC entity 910 of the (e)NodeB 701, which in turn transmits it within a fourth message #4 924 as a contention resolution to the MAC entity 906 of the UE 702. Upon receipt of the fourth message #4 924, the MAC entity 906 of the UE 702 may check for a contention resolution failure in 926 and may further determine if the Preamble Transnumber is smaller than the Preamble TransMax value +1 (in 928). Furthermore, the message #3 buffer is kept (block 930) and the RA procedure is completed (block 932). In case the MAC entity 906 of the UE 702 determines that no contention is detected in 934, it provides the RRC entity 904 of the UE 702 with the received RRC Connection Setup message 936.

The following (not necessary) assumptions are made for the following description:
the air interface between UE 702, 703 and base station 701 (Uu interface 705) uses LTE-FDD (Frequency Division Duplex) or LTE-TDD (Time Division Duplex);
the air interface between two (or more) (e.g. mobile) devices (e.g. UEs 702, 703) for direct UE-to-UE communication (Ud interface 704) uses the same or other frequency bands as/than the Uu interface 705; and
the (e.g. mobile) communication terminal devices that are engaged in D2D communication (over Ud interface 704) are controlled by the MNO (Mobile radio Network Operator) and therefore have an active RRC (Radio Resource Control) connection to the MNO's infrastructure (over Uu) at least during certain (periods of) times, e.g. during connection setup.

Illustratively, the D2D communication is under control of the MNO such as e.g. under the control of the mobile radio communication network implementing the UTRAN and the Core Network of the mobile radio communication system.

Figure 10:
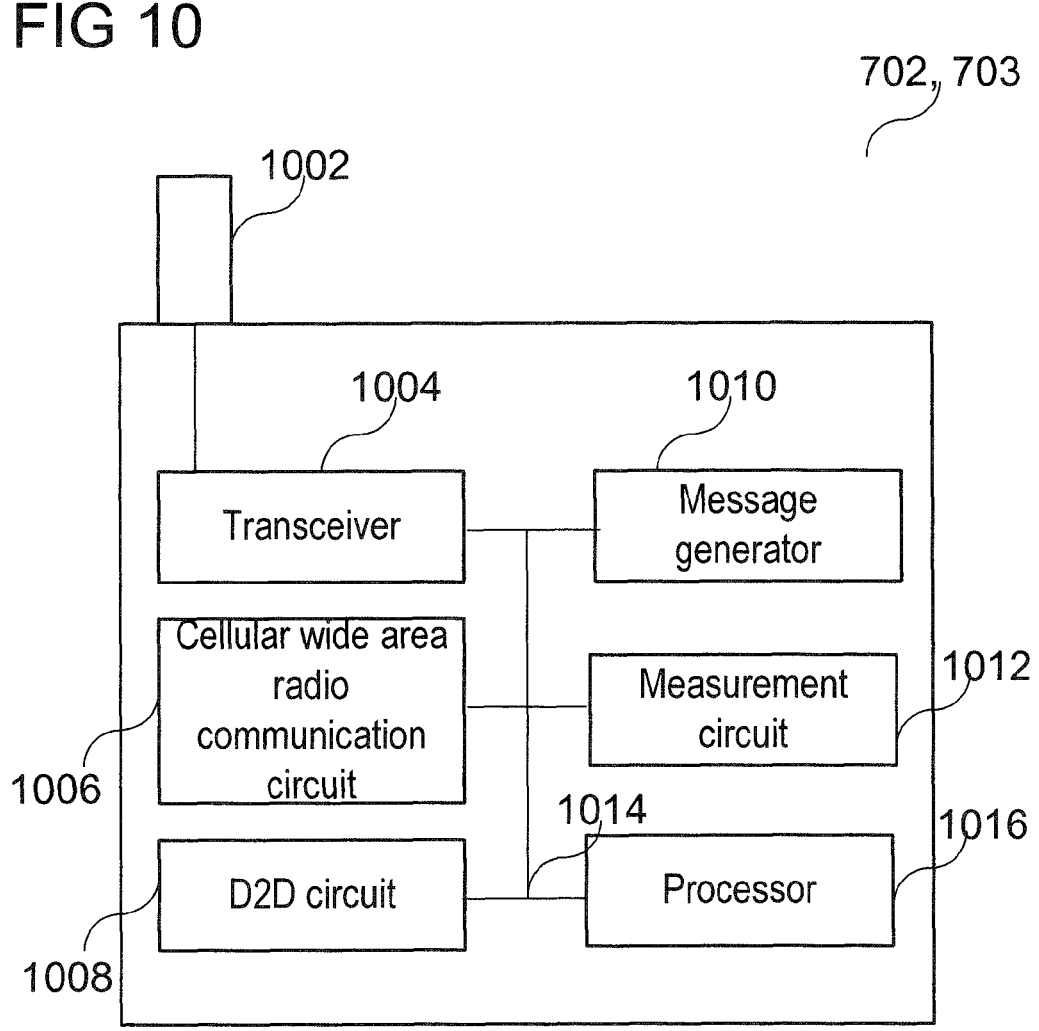
FIG. 10 shows a communication terminal device.

FIG. 10 shows a communication terminal device 1000.

As shown in FIG. 10, each UE 702, 703 may include one or more antennas 1002, a transceiver 1004 coupled to the one or more antennas 1002, wherein the transceiver 1004 may include one or more transmitters and/or one or more receivers. Moreover, each UE 702, 703 may include a cellular wide area radio communication technology circuit 1006 configured to provide a communication according to a cellular wide area radio communication technology such as e.g. a Third Generation Partnership Project (3GPP) communication technology such as e.g. UMTS (Universal Mobile Telecommunications System), LTE (Long Term Evolution), LTE-Advance, and the like. It is to be noted that any other cellular wide area radio communication technology may be provided such as e.g. a Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), CDMA2000 (Code division multiple access 2000), CDPD (Cellular Digital Packet Data), Mobitex, HSCSD (High-Speed Circuit-Switched Data), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), TD-CDMA (Time Division—Code Division Multiple Access), TD-CDMA (Time Division—Synchronous Code Division Multiple Access), cdmaOne (2G), CDMA2000 (3G) (Code division multiple access 2000 (Third generation)).

Each UE 702, 703 may further include a (D2D) circuit 1008 configured to provide a direct communication device to communication device communication (D2D) with another radio communication (terminal) device.

Furthermore, a message generator 1010 may be provided configured to generate a message including information of a direct communication device to communication device (D2D) communication with another radio communication (terminal) device provided by the circuit 1008.

Moreover, optionally, each UE 702, 703 may include a measurement circuit 1012 configured to measure a signal quality of signals of an established communication device to communication device (D2D) communication connection with the other radio communication (terminal) device. The transceiver 1004, the cellular wide area radio communication technology circuit 1006, the circuit 1008, the message generator 1010 and the optional measurement circuit 1012 may be coupled with each other, e.g. via one or more lines 1014, e.g. one or more bus lines 1014. Furthermore, a processor 1016 may be provided which may also be coupled to the one or more lines 1014. The processor 1016 may implement some or all of the functions provided in the context of the processes as will be described in more detail below. Furthermore, one or more of the following circuits may also be implemented by the processor 1016: the transceiver 1004, the cellular wide area radio communication technology circuit 1006, the circuit 1008, the message generator 1010, and/or the optional measurement circuit 1012.

As will be described in more detail below, the generated message may indicate a request to establish or re-establish a mobile radio communication connection. The generated message may be a network layer communication protocol message, e.g. a radio resource control (RRC) protocol message, such as e.g. an RRCConnectionRequest message (e.g. an RRCConnectionRequest message 802 as shown in FIG. 8).

As will be described in more detail below, the generated message may provide a mechanism for an indication of a reason for a RRC Connection Establishment Attempt.

In the following section several signalling examples (i.e., enhancements to the RRCConnectionRequest message (e.g. the RRCConnectionRequest message 802) are given: one aspect may be understood to define at least one D2D specific indicator that can be used by a D2D capable UE (e.g. UEs 702, 703) to inform the communication network side when the reason for a particular Random Access is related to direct UE-to-UE (D2D) communication, so that the infrastructure side can prioritize the incoming requests and/or prepare for (some sort of) D2D activity.

By way of example, the information of a direct communication device to communication device communication may include information of a reason for the request to establish or re-establish the mobile radio communication connection.

Furthermore, the message may include a message field including the information of a direct communication device to communication device communication. The message may include a message field including the information related to the reason of the request to establish or re-establish the mobile radio communication connection.

The information related to the reason of the request to establish or re-establish the mobile radio communication connection may include an indication that the request to establish or re-establish the mobile radio communication connection is for a direct communication device to communication device communication.

In order to implement this, a new field value may be added to the "Establishment Cause" Information Element (IE) of the RRCConnectionRequest message. With this additional information, the UE 702, 703 may be enabled to illustratively indicate to the network: "The reason for this RRC connection establishment attempt is related to D2D communication."

The following illustrates one possible implementation of the RRCConnectionRequest message (e.g. the RRCConnectionRequest message 802) in ASN.1 (Abstract Syntax Notation 1) notation:

```
-- ASN1START
RRCConnectionRequest ::=              SEQUENCE {
    criticalExtensions                CHOICE {
        rrcConnectionRequest-r8       RRCConnectionRequest-r8-IEs,
        criticalExtensionsFuture      SEQUENCE { }
    }
}
RRCConnectionRequest-r8-IEs ::= SEQUENCE {
    ue-Identity                       InitialUE-Identity,
    establishmentCause                EstablishmentCause,
    spare                             BIT STRING (SIZE (1))
}
InitialUE-Identity ::=                CHOICE {
    s-TMSI                            S-TMSI,
    randomValue                       BIT STRING (SIZE (40))
}
EstablishmentCause ::=                ENUMERATED {
                                      emergency, highPriorityAccess, mt-Access, mo-Signalling, mo-Data, delayTolerantAccess-v1020, D2D, spare1}
-- ASN1STOP
```

Illustratively, the field "EstablishmentCause" may include an additional field value (e.g. referred to as "D2D").

The information related to the reason of the request to establish or re-establish the mobile radio communication connection may include an indication that a direct communication device to communication device communication information is available in the radio communication terminal device. As an alternative or in addition to this, the information related to the reason of the request to establish or re-establish the mobile radio communication connection may include a request for a direct communication device to communication device communication control command.

In order to implement this, one or two new field values may be added to the "Establishment Cause" Information Element (IE) of the RRCConnectionRequest message.

The following illustrates one possible implementation of the RRCConnectionRequest message (e.g. the RRCConnectionRequest message 802) in ASN.1 notation:

```
-- ASN1START
RRCConnectionRequest ::=          SEQUENCE {
    criticalExtensions                CHOICE {
        rrcConnectionRequest-r8           RRCConnectionRequest-r8-IEs,
        criticalExtensionsFuture          SEQUENCE { }
    }
}
RRCConnectionRequest-r8-IEs ::= SEQUENCE {
    ue-Identity                       InitialUE-Identity,
    establishmentCause                EstablishmentCause,
    spare                                        BIT STRING (SIZE (1))
}
InitialUE-Identity ::=            CHOICE {
    s-TMSI                            S-TMSI,
    randomValue                       BIT STRING (SIZE (40))
}
    EstablishmentCause ::=        ENUMERATED {
                                      emergency, highPriorityAccess, mt-Access, mo-
Signalling, mo-Data, delayTolerantAccess-v1020, D2D-Info-Available, D2D-Action-Requested}
-- ASN1STOP
```

With these additions the UE 702, 703 may be enabled to illustratively indicate to the communication network whether "the reason for this RRC connection establishment attempt is related to D2D information (e.g., D2D information pertaining to D2D connection maintenance) being available in the UE" or "the reason for this RRC connection establishment attempt is to request D2D control commands from the network". Depending on the scenario (some of which will be described in more detail below) both of these two new field values may appear at the same time.

In another example, the information related to the reason of the request to establish or re-establish the mobile radio communication connection may include an indication that the request to establish or re-establish the mobile radio communication connection is for a direct communication device to communication device communication proximity detection and/or to a direct communication device to communication device communication.

In order to implement this, one or two new field values may be added to the "Establishment Cause" Information Element (IE) of the RRCConnectionRequest message.

The following illustrates one possible implementation of the RRCConnectionRequest message (e.g. the RRCConnectionRequest message 802) in ASN.1 notation:

```
-- ASN1START
RRCConnectionRequest ::=          SEQUENCE {
    criticalExtensions                CHOICE {
        rrcConnectionRequest-r8           RRCConnectionRequest-r8-IEs,
        criticalExtensionsFuture          SEQUENCE { }
    }
}
RRCConnectionRequest-r8-IEs ::= SEQUENCE {
    ue-Identity                       InitialUE-Identity,
    establishmentCause                EstablishmentCause,
    spare                                        BIT STRING (SIZE (1))
}
InitialUE-Identity ::=            CHOICE {
    s-TMSI                            S-TMSI,
    randomValue                       BIT STRING (SIZE (40))
}
EstablishmentCause ::=            ENUMERATED {
                                      emergency, highPriorityAccess, mt-Access, mo-
Signalling, mo-Data, delayTolerantAccess-v1020, D2D-Proximity-Detection, D2D-Communication}
-- ASN1STOP
```

Similar to the example above the UE 702, 703 may be enabled to illustratively indicate to the communication network whether "the reason for this RRC connection establishment attempt is related to D2D Proximity Detection" or "the reason for this RRC connection establishment attempt is related to a D2D Communication". Depending on the scenario both of these two new field values may appear at the same time.

In yet an alternative, the information related to the reason of the request to establish or re-establish the mobile radio communication connection may include an indication that the request to establish or re-establish the mobile radio communication connection is for a direct communication device to communication device communication public safety and/or to a direct communication device to communication device communication commercial usage.

In order to implement this, one or two new field values may be added to the "Establishment Cause" Information Element (IE) of the RRCConnectionRequest message.

The following illustrates one possible implementation of the RRCConnectionRequest message (e.g. the RRCConnectionRequest message 802) in ASN.1 notation:

radio communication connection may include an indication that the request to establish or re-establish the mobile radio communication connection is for a direct communication device to communication device communication session transfer.

In order to implement this, one new field value may be added to the "Establishment Cause" Information Element (IE) of the RRCConnectionRequest message.

The following illustrates one possible implementation of the RRCConnectionRequest message (e.g. the RRCConnectionRequest message 802) in ASN.1 notation:

```
-- ASN1START
RRCConnectionRequest ::=        SEQUENCE {
    criticalExtensions              CHOICE {
        rrcConnectionRequest-r8         RRCConnectionRequest-r8-IEs,
        criticalExtensionsFuture        SEQUENCE { }
    }
}
RRCConnectionRequest-r8-IEs ::= SEQUENCE {
    ue-Identity                     InitialUE-Identity,
    establishmentCause              EstablishmentCause,
```

```
-- ASN1START
RRCConnectionRequest ::=        SEQUENCE {
    criticalExtensions              CHOICE {
        rrcConnectionRequest-r8         RRCConnectionRequest-r8-IEs,
        criticalExtensionsFuture        SEQUENCE { }
    }
}

RRCConnectionRequest-r8-IEs ::= SEQUENCE {
    ue-Identity                     InitialUE-Identity,
    establishmentCause              EstablishmentCause,
    spare                           BIT STRING (SIZE (1))
}

InitialUE-Identity ::=          CHOICE {
    s-TMSI                          S-TMSI,
    randomValue                     BIT STRING (SIZE (40))
}
EstablishmentCause ::=          ENUMERATED {
                                    emergency, highPriorityAccess, mt-Access, mo-
Signalling, mo-Data, delayTolerantAccess-v1020, D2D-Public-Safety, D2D-Commercial}
-- ASN1STOP
```

Similar to the example above the UE 702, 703 may be enabled to illustratively indicate to the communication network whether "the reason for this RRC connection establishment attempt is related to D2D Public Safety" or "the reason for this RRC connection establishment attempt is related to a D2D Commercial use case". Both of these two new field values may or may not appear at the same time (it is rather unlikely that both of these two new field values may appear at the same time).

In yet another alternative, the information related to the reason of the request to establish or re-establish the mobile -continued

```
    spare                           BIT STRING
                                            (SIZE (1))
}
InitialUE-Identity ::=          CHOICE {
    s-TMSI                          S-TMSI,
    randomValue                     BIT STRING (SIZE (40))
}
EstablishmentCause ::=          ENUMERATED {
                                    emergency,
```

```
         highPriorityAccess,
         mt-Access, mo-
Signalling, mo-Data, delayTolerantAccess-v1020, D2D-Session-Transfer,
spare1}
   -- ASN1STOP
```

With this new field value, the UE 702, 703 may be enabled to illustratively indicate to the communication network if "the reason for this RRC connection establishment attempt is related to D2D session transfer".

Furthermore, a new container "D2DLinkList" may be added to the RRCConnectionRequest message.

The new container element "D2DLinkList" may be provided and defined for inclusion in the RRCConnectionRequest message. It may contain at least one (up to max) "D2DLink" sequence(s) with D2D communication link specific pieces of information. In other words, there may be one "D2DLink" sequence for each D2D communication link that the UE (e.g. UE 702, 703) is already engaged in, or it is about to engage in (or has at least examined in preparation for joining it). The example parameters listed here are optional, i.e. not all of them may appear in an instance of a "D2DLink" sequence. "LinkId" and/or "PeerEntityID" may be used to specify one particular direct device-to-device communication path. The novel indicator "Reason" may indicate the D2D related motivation for the UE (e.g. UE 702, 703) to kick off this particular RRC Connection Establishment attempt. It may be accompanied by some additional pieces of information, such "Info", "Action", "TrafficType" and/or "ServiceType". By setting the listed field values accordingly the information element "Info" may be used to signal to the communication infrastructure when the UE (e.g. UE 702, 703) has detected proximity (or loss of proximity) to another communication device in its vicinity, or when the communication link quality of an existing direct device-to-device communication path has changed (improved or decreased), or when a D2D communication link needs to be established after proximity has been detected. The information element "Action" may be used when the UE (e.g. UE 702, 703) requests a certain D2D related action from the communication infrastructure, such as allowance to establish/terminate a D2D communication link to a D2D peer entity in its vicinity, or reconfiguration of an ongoing D2D communication path, or kick-off communication session transfer from D2D mode to infrastructure mode of operation. The information elements "TrafficType" and "ServiceType" are self-explanatory, and do not require more explanations.

This example may allow full flexibility and by choosing only a sub set of the listed optional parameters (depending of the actual scenario the UE is involved in) the size of the "D2DLinkList" container can be kept small (especially when there is only information about one D2D communication link available max can be set to '1').

The following illustrates one possible implementation of the RRCConnectionRequest message (e.g. the RRCConnectionRequest message 802) in ASN.1 notation:

```
-- ASN1START
RRCConnectionRequest ::=         SEQUENCE {
   criticalExtensions               CHOICE {
      rrcConnectionRequest-r8         RRCConnectionRequest-r8-IEs,
      criticalExtensionsFuture        SEQUENCE { }
   }
}
RRCConnectionRequest-r8-IEs ::= SEQUENCE {
   ue-Identity                      InitialUE-Identity,
   establishmentCause               EstablishmentCause,
   spare                                  BIT STRING (SIZE (1))
}
D2DLinkList                      SEQUENCE (SIZE (1..max)) OF D2DLink
}
D2DLink ::=                      SEQUENCE {
   LinkID                           BIT STRING (SIZE (16))
   PeerEntityID                   BIT STRING (SIZE 40))
   Reason                           ENUMERATED {Info-Available, Action-
Requested}
   Info                             ENUMERATED {ProximityDetected, Communication,
LinkQuality, ...}
   Action                           ENUMERATED {EstablishD2DLink,
ReconfigureD2DLink, TerminateD2DLink, SessionTransfer, ...}
   Traffic-Type                     ENUMERATED {signalling, conversational real-time,
non-real-time, voice, audio, streaming, gaming, ...}
   Service-Type                     ENUMERATED {public-safety, commercial, ...}
   ...
}
InitialUE-Identity ::=           CHOICE {
   s-TMSI                           S-TMSI,
   randomValue                      BIT STRING (SIZE (40))
}
EstablishmentCause ::=           ENUMERATED {
                                     emergency, highPriorityAccess, mt-Access, mo-
Signalling, mo-Data, delayTolerantAccess-v1020, spare 2, spare1}
-- ASN1STOP
```

Yet an alternative "D2DLink" structure, for instance for usage in the D2DLinkList container as described above will be provided in the following.

This example shows another possible "D2DLink" sequence with three parameters. If the UE (e.g. UE 702, 703) detects a declining reception quality of the direct UE-to-UE communication path, it may choose to set the parameters as highlighted below:

```
         D2DLink ::= SEQUENCE {
         PeerEntityID BIT STRING (SIZE (40))
         Reason          ENUMERATED {Info-Available, Action-
Requested}
         Action          ENUMERATED {EstablishD2DLink,
ReconfigureD2DLink, SessionTransfer, ...}
         ...
     }
```

Upon reception of a RRCConnectionRequest message containing the "D2DLink" information element with these settings, the receiving base station can identify immediately, that the reason for this particular RRC Connection Establishment instance is "D2D Session Transfer" from D2D mode to infrastructure mode to keep the communication connection to peer entity PeerEntityID alive, and it may start paging the peer entity UE (e.g. UE 702, 703) over the second Uu2 communication link before the RRC Connection on the first Uu1 communication link has been established (as will be illustrated further below).

As will be described in more detail below, the generated message may provide a mechanism for an indication of a Reason for a RRC Connection Establishment Attempt.

As will be described in more detail below, various aspects of this disclosure may provide a mechanism for a behaviour of the communication system infrastructure after the reception of the above described communication connection establishment cause(s).

Figure 11:
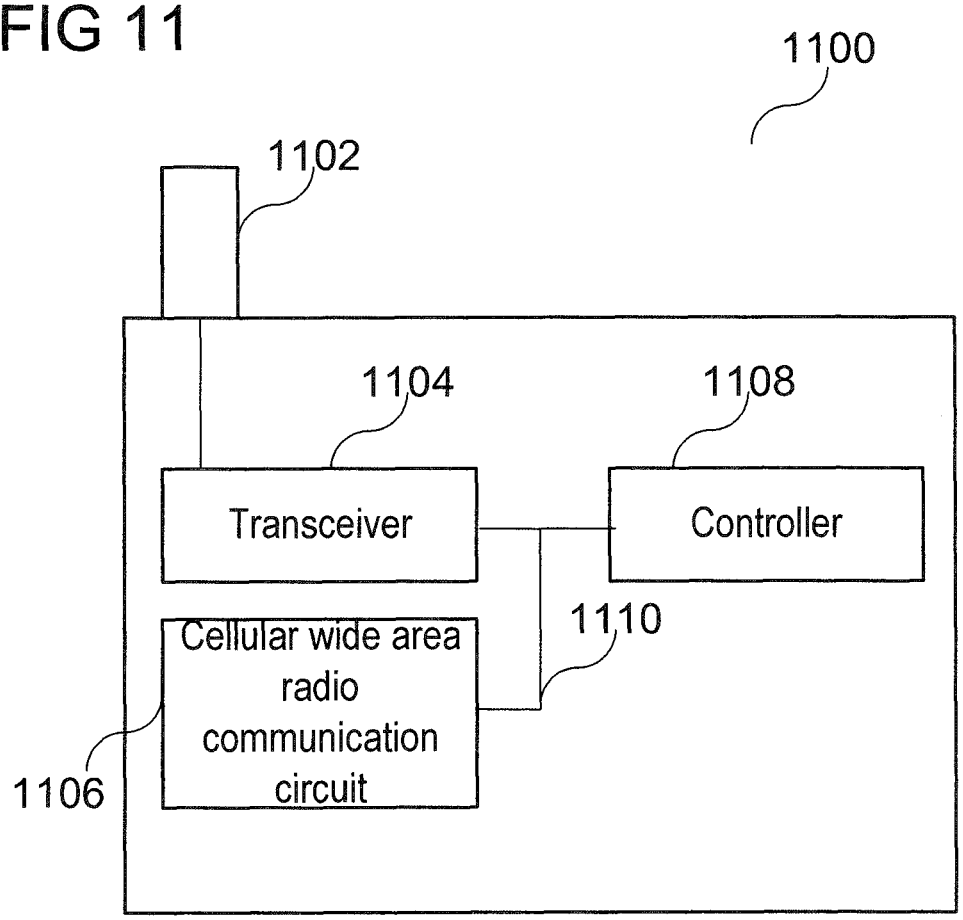
FIG. 11 shows a cellular wide area radio base station.

Upon reception of the novel indicator(s) as described above, E-UTRAN (e.g. (e)NodeB 701) may initiate various D2D related actions. The following figures show exemplary flow diagrams with a number of process steps to be performed by the base station (e.g. (e)NodeB 701):

The processes may be carried out by a cellular wide area radio base station 1100 (which may correspond e.g. to (e)NodeB 701) as shown in FIG. 11.

As shown in FIG. 11, the cellular wide area radio base station 1100 may include one or more antennas 1102 and a transceiver 1104, wherein the transceiver may include a transmitter and a receiver configured to receive a message (e.g. 802) from a first UE (e.g. first UE 702), wherein the message (e.g. 802) may include information of a direct communication device to communication device communication of the first radio communication device with a second radio communication device (e.g. second UE, e.g. second UE 703). Furthermore, it may include a cellular wide area radio communication technology circuit 1106 configured to provide a communication according to a cellular wide area radio communication technology. Furthermore, a controller 1108 may be provided configured to carry out a predefined process with respect to a direct communication device to communication device communication based on the message (e.g. 802). For instance, the controller 1108 may be configured to carry out a predefined process dependent on one of the novel establishment reasons discussed above that may be contained in the RRCConnectionRequest message 802.

The transceiver 1104, the cellular wide area radio communication technology circuit 1106 and the controller 1108 may be coupled with each other, e.g. via one or more lines 1110, e.g. one or more bus lines 1110. The controller 1108 may implement some or all of the functions provided in the context of the processes as has been described above. Furthermore, a processor may be provided to implement one or more of the following circuits: the controller 1108, the transceiver 1104, and the cellular wide area radio communication technology circuit 1106.

In general, the processes may include one or more of the following:

1. The RRCConnectionRequest message (e.g. RRCConnectionRequest message 802) is received.

2. The D2D-Indicator (if present) may be extracted from the RRCConnectionRequest message (e.g. RRCConnectionRequest message 802).

3. E-UTRAN may then double-check the settings of the D2D-Indicator (if present).

4. Based on the current scenario and the D2D-Indicator settings different communication infrastructure behavior may apply:

a) Precedence for handling a particular RRC connection establishment request on communication network side can be adjusted. The communication network may now be enabled to handle requests that are related to "D2D Actions" with higher priority than those that are related to "D2D Information".

b) Precedence for handling a particular RRC connection establishment request on communication network side can be adjusted. The communication network may now be enabled to handle requests that are related to "D2D Public Safety" with higher priority than those that are related to "D2D Commercial" use cases.

c) Part of the priority handling may include special assignment of resources to UEs that are engaged (or are about to engage) in D2D traffic.

d) The communication network may now be enabled to perform early UE context updates in a data base e.g., for session transfer ("UEx has detected D2D proximity") from communication infrastructure mode to D2D mode of operation.

e) The communication network may now be enabled to query information (e.g., D2D UE capability or D2D subscription related information) from a data base, such as the HLR (Home Location Register), e.g., for session transfer from communication infrastructure mode to D2D mode of operation ("Is UEx capable of engaging in D2D communication?", or "Is subscriber X (user X) allowed (e.g., per his subscription) to engage in D2D communication?").

f) The communication network may now be enabled to store in a data base located in the MNO's domain D2D information based on the D2D-Indicator settings (e.g., UE related D2D information or subscription related D2D information). Said data base may be one of included in, or assigned to, or accessible by one of a radio access network entity (such as a base station), or a core network entity (such as HLR or MME). Illustratively, the following pieces of information may be stored in said data base: "UEx found a D2D peer device" or "UEx has detected presence of D2D cluster (with assigned D2D-Cluster-ID Y) with matching D2D capabilities" or "Subscriber Z (user Z) is currently engaged in D2D communication" and so on.

The network may now be enabled to initiate early paging of other UEs (communication partners) for communication session transfer from D2D mode to communication infrastructure mode of operation, The communication network may now be enabled to (prepare to) request additional information from the UE, e.g.:

retrieve positioning data (detected in the course of the D2D proximity detection procedure), or retrieve auxiliary information about the type of service that was terminated or is about to be started (for instance, related to QoS for the direct UE-to-UE communication path).

The following flow diagrams give some examples for D2D specific communication network behaviour based on the various novel indicators that are conveyed from the UE (e.g. UE 702, 703) to the communication infrastructure as part of the Random Access procedure (or in general: while the UE performs RRC Connection Establishment).

Figure 12:
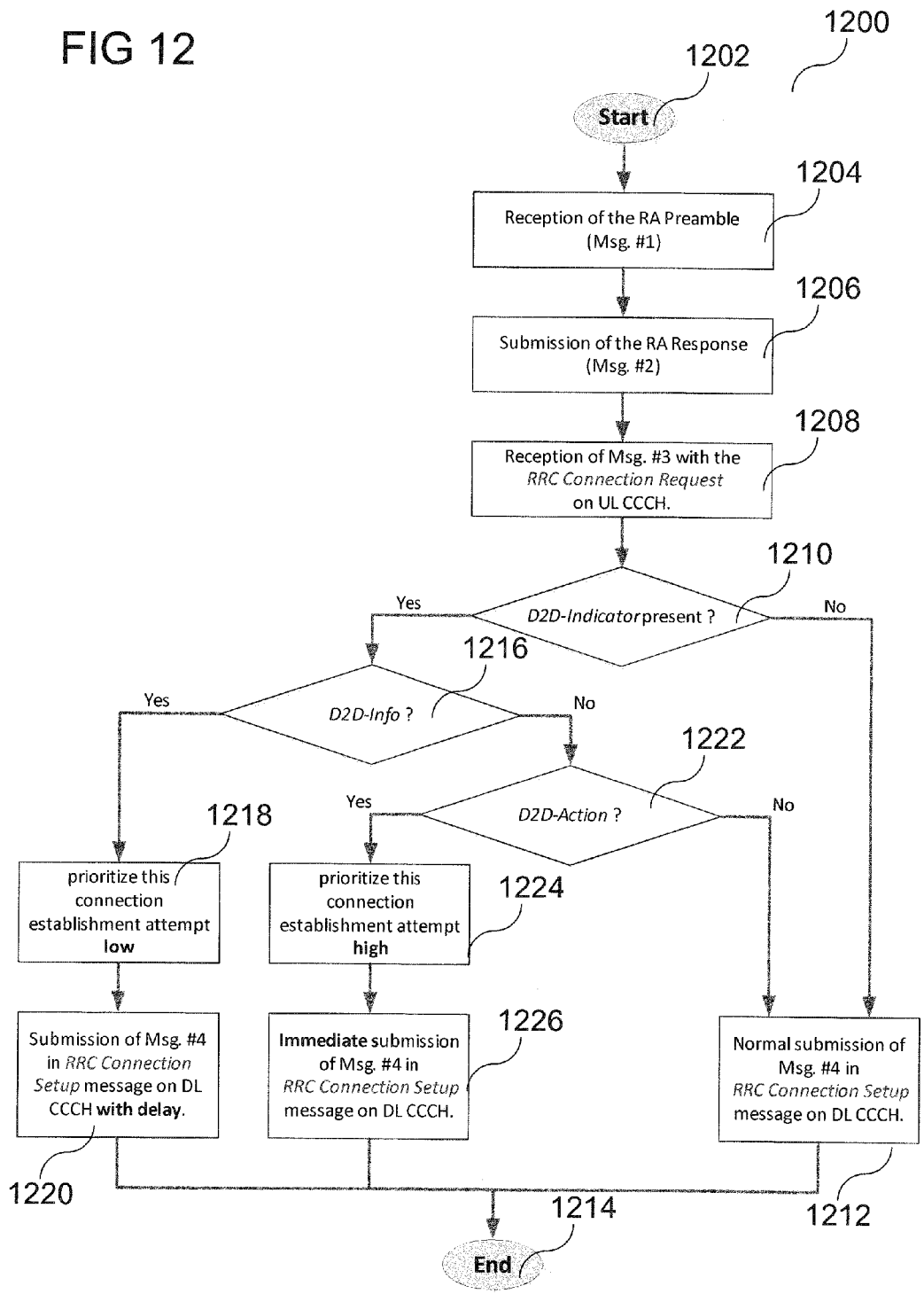
FIG. 12 shows a first flow diagram illustrating a process carried out by the cellular wide area radio base station.

Upon reception of the novel indicator, E-UTRAN may initiate various D2D related actions. FIG. 12 shows an exemplary first flow diagram 1200 with a number of process steps to be performed by the (e)NodeB 701: here, e.g. prioritization and de-prioritization may be provided, for example the communication network may be enabled to handle requests for RRC Connection Establishment that are related to "D2D Actions" with higher priority than those that are related to "D2D Information".

FIG. 12 shows a first flow diagram illustrating a first process 1200 which may be carried out by the cellular wide area radio base station 1100.

The first process 1200 may start in 1202. In 1204, the cellular wide area radio base station 1100 may receive a RA (Random Access) Preamble, e.g. message #1 908 of FIG. 9. Furthermore, in 1206, the cellular wide area radio base station 1100 may submit an RA (Random Access) Response, e.g. message #2 912 of FIG. 9. Then, in 1208, the cellular wide area radio base station 1100 may receive the third message #3 916 of FIG. 9, which includes the RRCConnectionRequest message 902/918, via UL CCCH.

Then, in 1210 the cellular wide area radio base station 1100 may determine as to whether a D2D indicator as described above is present in the received RRCConnectionRequest message 902/918.

If this is not the case ("No" in 1210), the process may continue in 1212, wherein the cellular wide area radio base station 1100 may (as the conventional process) submit the fourth message #4 924, which may include the RRCConnectionSetup message 922, via DL CCCH. The process 1200 may then end in 1214.

In case it is determined by the cellular wide area radio base station 1100 in 1210 ("Yes" in 1210) that a D2D indicator as described above is present in the received RRCConnectionRequest message 902/918, the cellular wide area radio base station 1100 may further determine in 1216, as to whether the D2D indicator is a D2D Info (information) indicator.

If this is the case ("Yes" in 1216), the process may continue in 1218, wherein the cellular wide area radio base station 1100 may classify the RRCConnectionRequest message 902/918 to prioritize this RRC communication connection establishment attempt low. Furthermore, the cellular wide area radio base station 1100 may then, in 1220, submit the fourth message #4 924 including the RRCConnectionSetup message 922 via DL CCCH with a time delay (which may be predefined or random). The process 1200 may then end in 1214.

If this is not the case ("No" in 1216), the process may continue in 1222, wherein the cellular wide area radio base station 1100 may further determine as to whether the D2D indicator is a D2D action indicator.

If this is not the case ("No" in 1222), the process may continue in 1212, wherein the cellular wide area radio base station 1100 may (as the conventional process) submit the fourth message #4 924, which may include the RRCConnectionSetup message 922, via DL CCCH. The process 1200 may then end in 1214.

If this is the case ("Yes" in 1222), the process may continue in 1224, wherein the cellular wide area radio base station 1100 may classify the RRCConnectionRequest message 902/918 to prioritize this RRC communication connection establishment attempt high. Furthermore, the cellular wide area radio base station 1100 may then, in 1226, immediately submit the fourth message #4 924 including the RRCConnectionSetup message 922 via DL CCCH. The process 1200 may then end in 1214.

Figure 13:
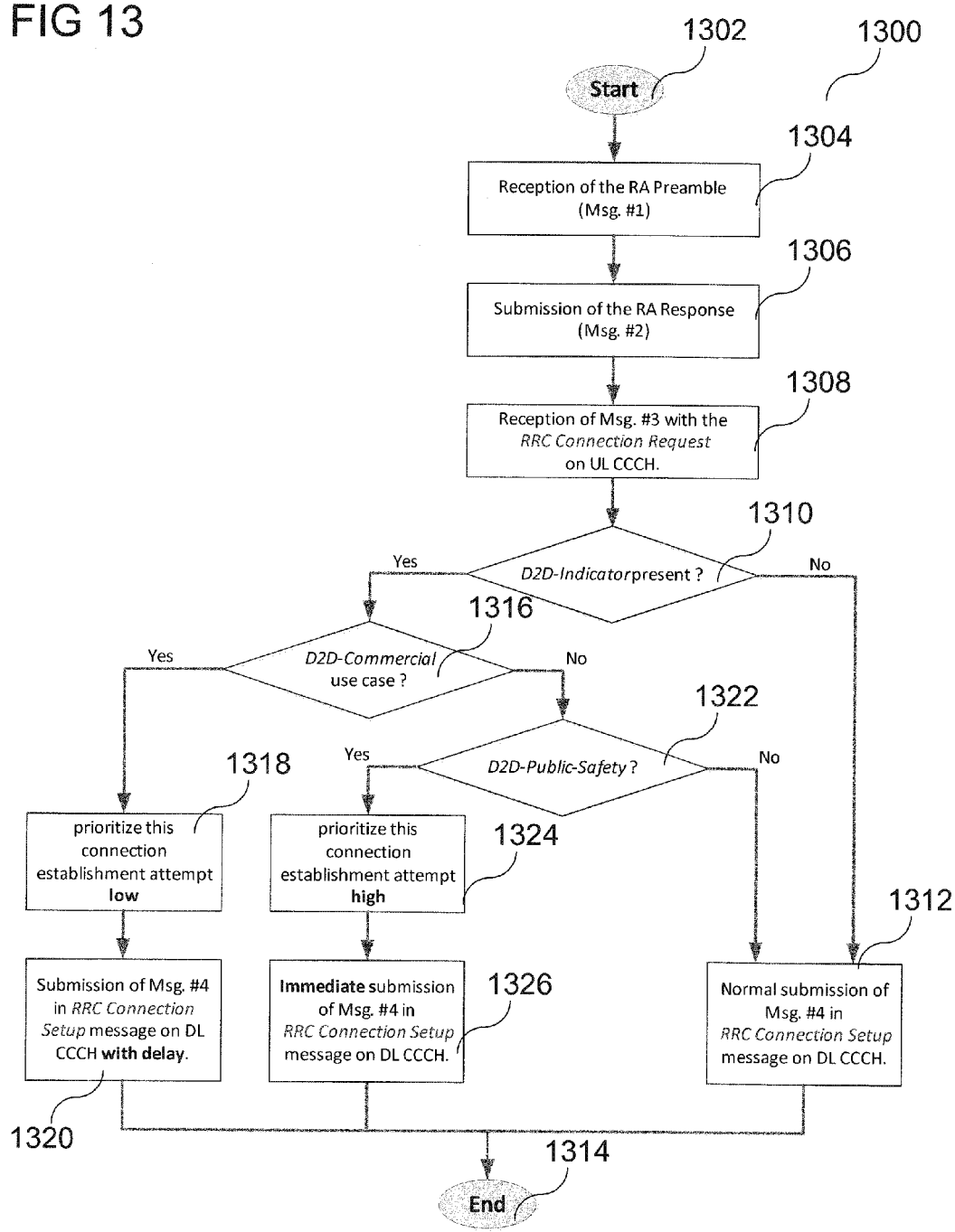
FIG. 13 shows a second flow diagram illustrating a process carried out by the cellular wide area radio base station.

FIG. 13 illustrates a similar process. Here, the communication network may be enabled to handle requests for RRC Connection Establishment that are related to "D2D Public Safety" with higher priority than those that are related to "D2D Commercial use cases", as will be described in more detail below.

FIG. 13 shows a second flow diagram illustrating a second process 1300 which may also be carried out by the cellular wide area radio base station 1100.

The second process 1300 may start in 1302. In 1304, the cellular wide area radio base station 1100 may receive a RA (Random Access) Preamble, e.g. message #1 908 of FIG. 9. Furthermore, in 1306, the cellular wide area radio base station 1100 may submit an RA (Random Access) Response, e.g. message #2 912 of FIG. 9. Then, in 1308, the cellular wide area radio base station 1100 may receive the third message #3 916 of FIG. 9, which includes the RRCConnectionRequest message 902/918, via UL CCCH.

Then, in 1310 the cellular wide area radio base station 1100 may determine as to whether a D2D indicator as described above is present in the received RRCConnectionRequest message 902/918.

If this is not the case ("No" in 1310), the second process 1300 may continue in 1312, wherein the cellular wide area radio base station 1100 may (as the conventional process) submit the fourth message #4 924, which may include the RRCConnectionSetup message 922, via DL CCCH. The second process 1300 may then end in 1314.

In case it is determined by the cellular wide area radio base station 1100 in 1310 ("Yes" in 1310) that a D2D indicator as described above is present in the received RRCConnectionRequest message 902/918, the cellular wide area radio base station 1100 may further determine in 1316, as to whether the D2D indicator is a D2D Commercial use cases indicator.

If this is the case ("Yes" in 1316), the second process 1300 may continue in 1318, wherein the cellular wide area radio base station 1100 may classify the RRCConnectionRequest message 902 to prioritize this RRC communication connection establishment attempt low. Furthermore, the cellular wide area radio base station 1100 may then, in 1320, submit the fourth message #4 924 including the RRCConnectionSetup message 922 via DL CCCH with a time delay (which may be predefined or random). The second process 1300 may then end in 1314.

If this is not the case ("No" in 1316), the second process 1300 may continue in 1322, wherein the cellular wide area radio base station 1100 may further determine as to whether the D2D indicator is a D2D public safety indicator.

If this is not the case ("No" in 1322), the second process 1300 may continue in 1312, wherein the cellular wide area radio base station 1100 may (as the conventional process) submit the fourth message #4 924, which may include the RRCConnectionSetup message 922, via DL CCCH. The second process 1300 may then end in 1314.

If this is the case ("Yes" in 1322), the second process may continue in 1324, wherein the cellular wide area radio base station 1100 may classify the RRCConnectionRequest message 902 to prioritize this RRC communication connection establishment attempt high. Furthermore, the cellular wide area radio base station 1100 may then, in 1326, immediately submit the fourth message #4 924 including the RRCConnectionSetup message 922 via DL CCCH. The second process 1300 may then end in 1314.

Figure 14:
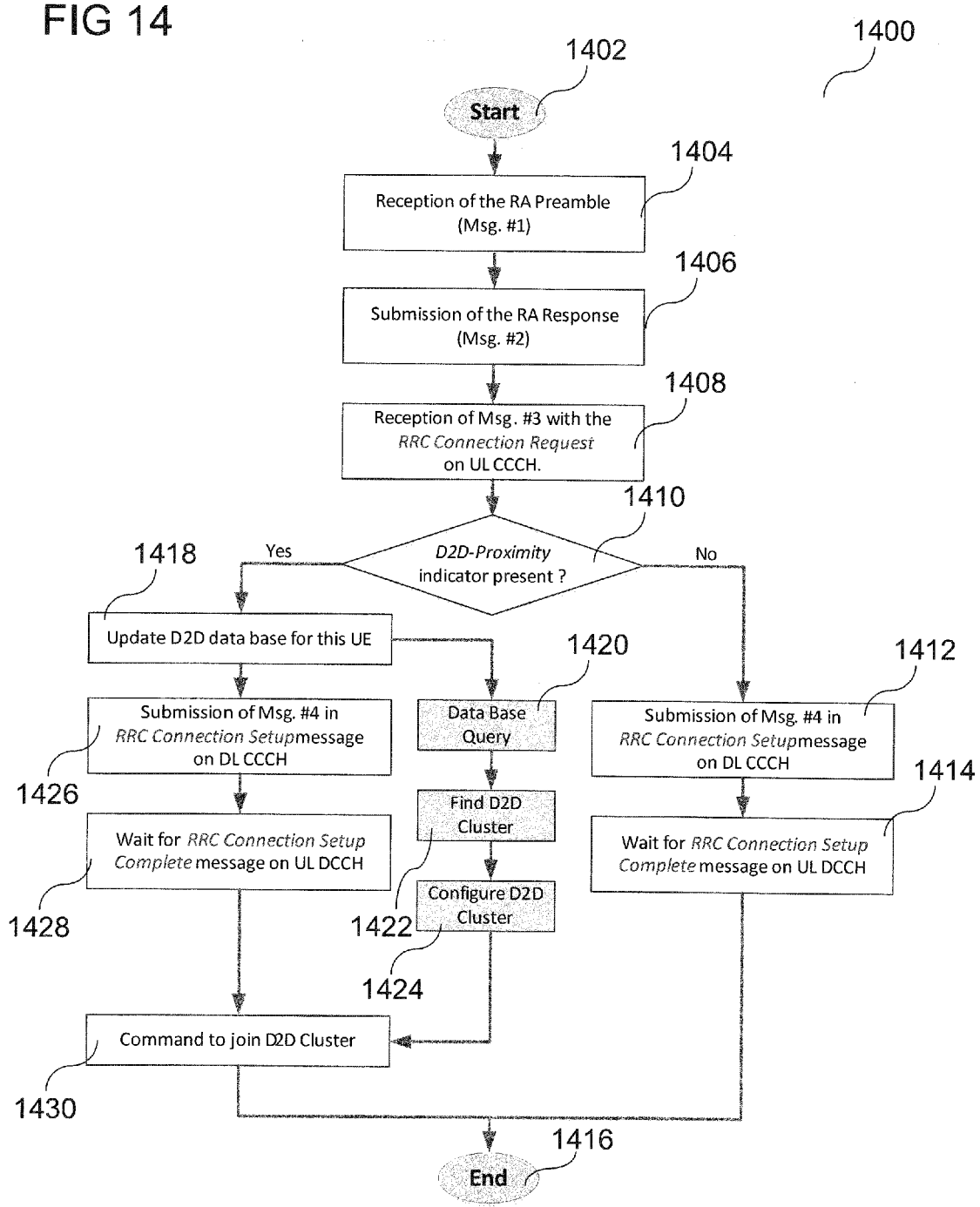
FIG. 14 shows a third flow diagram illustrating a process carried out by the cellular wide area radio base station.

In FIG. 14. early UE context update is shown in conjunction with kick-off of additional D2D-related functions pertaining to proximity, as will be described in more detail below.

FIG. 14 shows a third flow diagram illustrating a third process 1400 which may also be carried out by the cellular wide area radio base station 1100.

The third process 1400 may start in 1402. In 1404, the cellular wide area radio base station 1100 may receive a RA (Random Access) Preamble, e.g. message #1 908 of FIG. 9. Furthermore, in 1406, the cellular wide area radio base station 1100 may submit an RA (Random Access) Response, e.g. message #2 912 of FIG. 9. Then, in 1408, the cellular wide area radio base station 1100 may receive the third message #3 916 of FIG. 9, which includes the RRCConnectionRequest message 902/918, via UL CCCH.

Then, in 1410 the cellular wide area radio base station 1100 may determine as to whether a D2D Proximity indicator as described above is present in the received RRCConnectionRequest message 902/918.

If this is not the case ("No" in 1410), the third process 1400 may continue in 1412, wherein the cellular wide area radio base station 1100 may (as the conventional process) submit the fourth message #4 924, which may include the RRCConnectionSetup message 922, via DL CCCH. Then, in 1414, the cellular wide area radio base station 1100 may wait for an RRCConnectionSetupComplete message from the UE (e.g. the first UE 702) on UL DCCH. The third process 1400 may then end in 1416.

In case it is determined by the cellular wide area radio base station 1100 in 1410 ("Yes" in 1410) that a D2D Proximity indicator as described above is present in the received RRCConnectionRequest message 902/918, the cellular wide area radio base station 1100 may, in 1418, update a D2D data base provided for and/or associated with this UE (e.g. the first UE 702). For instance, this may be implemented by adding/adjusting/deleting an entry in the HLR or MME for this particular UE (or for the corresponding subcriber) in 1418. In 1420 a data base query may be implemented (e.g., an HLR query or an MME query, for instance in order to find/identify suitable and/or capable and/or allowed D2D peer entities and/or respective users), and in 1422 a D2D cluster may be identified and/or established and/or formed, which may then be configured in 1424. Moreover, the cellular wide area radio base station 1100 may submit the fourth message #4 924 including the RRCConnectionSetup message 922 via DL CCCH (in 1426) and may wait for an RRCConnectionSetupComplete message from the UE (e.g. the first UE 702) on UL DCCH in 1428. Furthermore, after having carried out the processes 1424 and/or 1428, the cellular wide area radio base station 1100 may provide a command to join the D2D cluster in 1430. The third process 1400 may then end in 1416.

It should be noted that in parallel to (and independent from) one of the processes 1420, 1422, 1424 the cellular wide area radio base station 1100 may process one of the processes 1418, 1426, 1428, 1430.

Illustratively, in the third process 1400 as shown in FIG. 14, if "D2D-Proximity" is indicated during the Random Access, the (e)NodeB (e.g. (e)NodeB 701) may immediately update the UE's context and may initiate additional communication network functions pertaining to D2D proximity (processes 1420, 1422, 1424).

Figure 15:
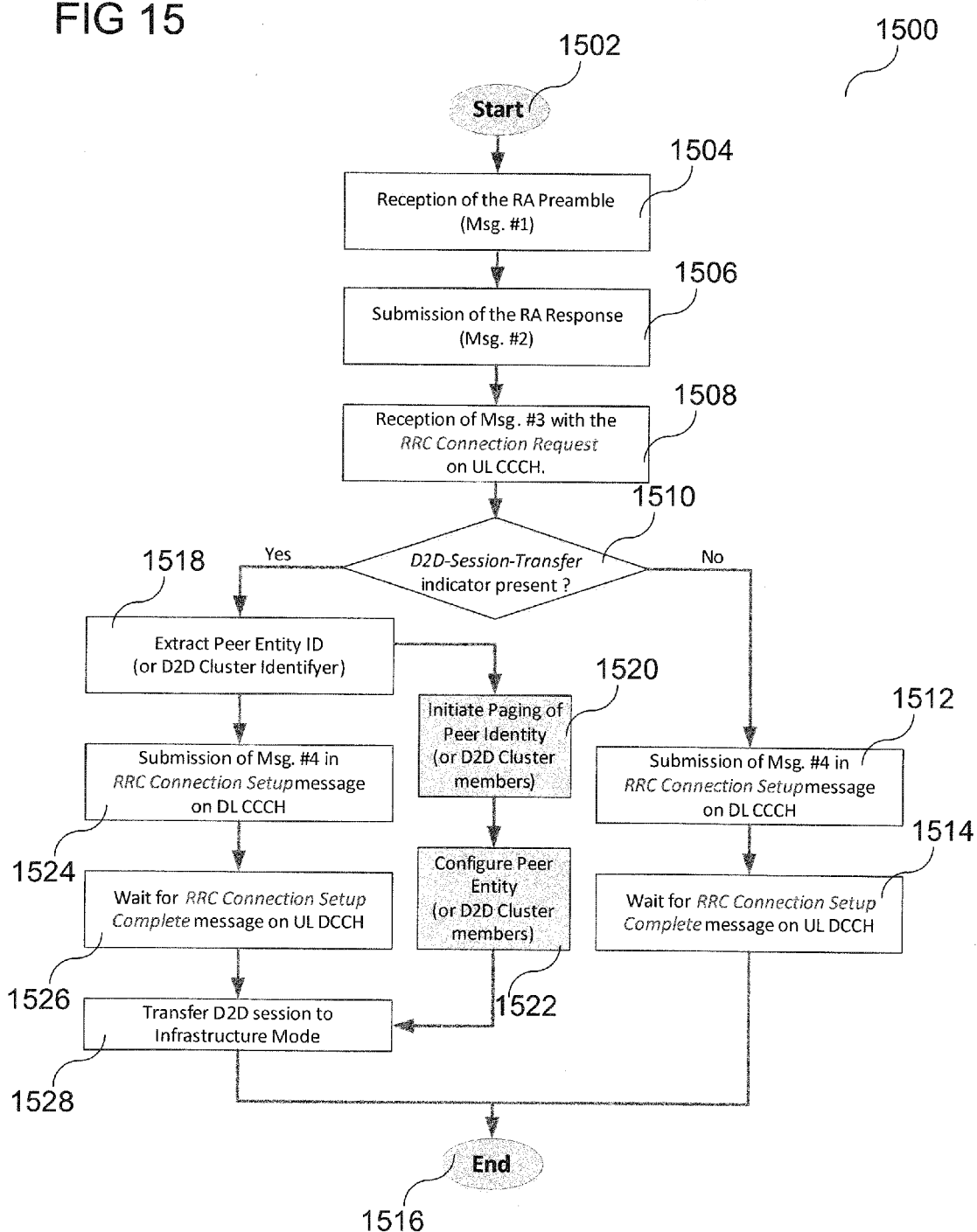
FIG. 15 shows a fourth flow diagram illustrating a process carried out by the cellular wide area radio base station.

FIG. 15 illustratively deals with the preparation of a communication session transfer from D2D mode to communication infrastructure mode of operation.

FIG. 15 shows a fourth flow diagram illustrating a fourth process 1500 which may also be carried out by the cellular wide area radio base station 1100.

The fourth process 1500 may start in 1502. In 1504, the cellular wide area radio base station 1100 may receive a RA (Random Access) Preamble, e.g. message #1 908 of FIG. 9. Furthermore, in 1506, the cellular wide area radio base station 1100 may submit an RA (Random Access) Response, e.g. message #2 912 of FIG. 9. Then, in 1508, the cellular wide area radio base station 1100 may receive the third message #3 916 of FIG. 9, which includes the RRCConnectionRequest message 902/918, via UL CCCH.

Then, in 1510 the cellular wide area radio base station 1100 may determine as to whether a D2D Session Transfer indicator as described above is present in the received RRCConnectionRequest message 902/918.

If this is not the case ("No" in 1510), the fourth process 1400 may continue in 1512, wherein the cellular wide area radio base station 1100 may (as the conventional process) submit the fourth message #4 924, which may include the RRCConnectionSetup message 922, via DL CCCH. Then, in 1514, the cellular wide area radio base station 1100 may wait for an RRCConnectionSetupComplete message from the UE (e.g. the first UE 702) on UL DCCH. The fourth process 1500 may then end in 1516.

In case it is determined by the cellular wide area radio base station 1100 in 1510 ("Yes" in 1510) that a D2D Session Transfer indicator as described above is present in the received RRCConnectionRequest message 902/918, the cellular wide area radio base station 1100 may, in 1518, extract a peer entity ID (or D2D cluster identifier). This may be implemented, in 1520, by initiating a paging of peer identity (or D2D cluster members), and, in 1522, by configuring peer identity (or D2D cluster members). Moreover, the cellular wide area radio base station 1100 may submit the fourth message #4 924 including the RRCConnectionSetup message 922 via DL CCCH (in 1524) and may wait for an RRCConnectionSetupComplete message from the UE (e.g. the first UE 702) on UL DCCH in 1526. Furthermore, after having carried out the processes 1522 and/or 1526, the cellular wide area radio base station 1100 may, in 1528, transfer the D2D communication session to communication infrastructure mode. The fourth process 1500 may then end in 1516.

Illustratively, in the fourth process 1500 as shown in FIG. 15, if "D2D-Session-Transfer" is indicated during Random Access, the (e)NodeB (e.g. (e)NodeB 701) may run a paging and/or configuration procedure in parallel in order to guarantee a fast and successful communication session transfer (processes 1520, 1522).

While the RRC Connection Establishment procedure is usually initiated by the UE to get initial access to the radio access network (RAN), the purpose of the RRC Connection Re-Establishment procedure is to re-establish a deteriorating RRC connection. It may involve resumption of SRB1 operation and re-activation of the previous security context. When an ongoing RRC connection is collapsing the UE may choose to initiate this procedure for example upon detection of radio link failure (RLF) or upon handover failure (HOF).

In the following, some further considerations for RRC Connection Re-Establishment will be described.

One D2D use case deals with service continuity, i.e. with switching an active communication path from a direct UE-to-UE communication (over the Ud interface 704) to communication infrastructure assisted communication (over two Uu interfaces 705 with base station 701 involvement), and vice versa. This is also commonly known as "D2D session transfer".

Figure 16:
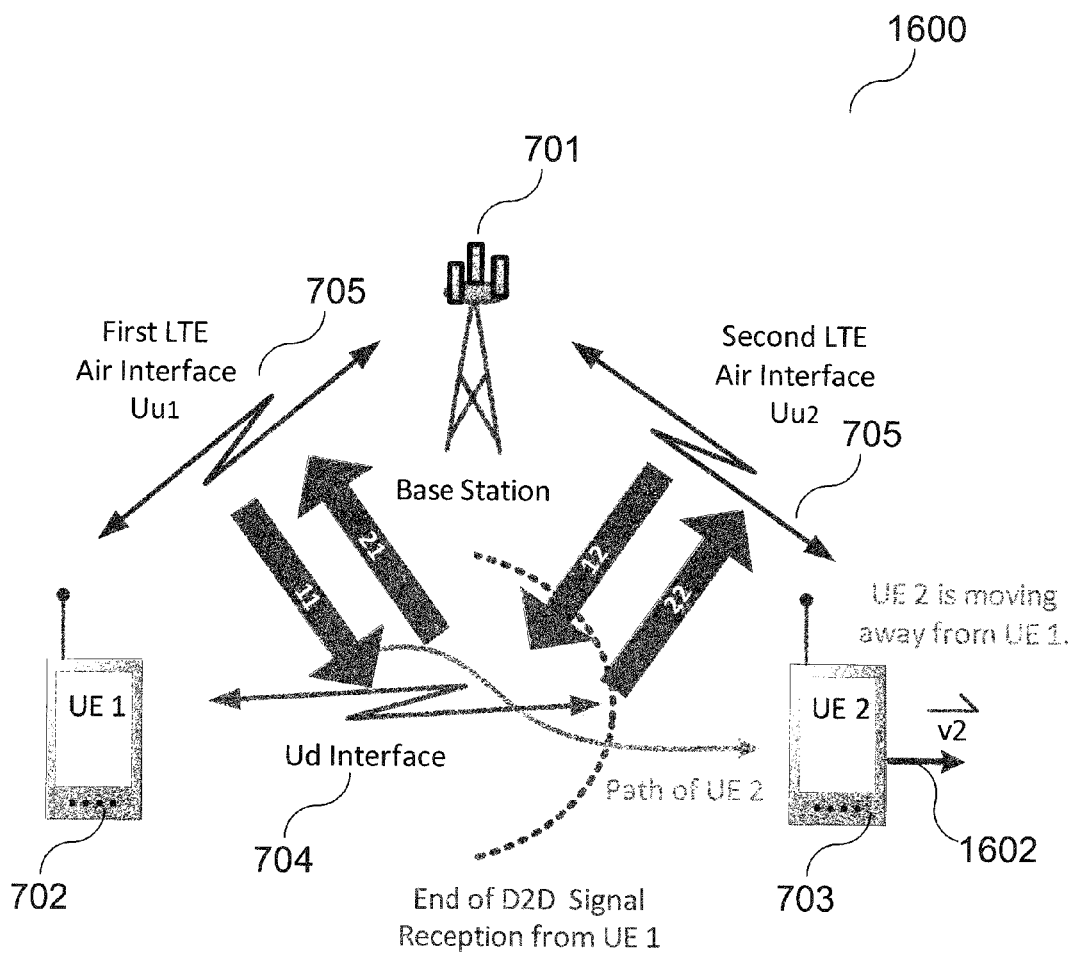
FIG. 16 shows a communication system.

In case such a 'legacy' communication infrastructure assisted communication path via the Uu interfaces 705 between two UEs (e.g. first UE 702 and second UE 703), is supposed to be transferred to a direct UE-to-UE communication (via the Ud interface 704), as indicated in FIG. 16 by means of a first arrow 11 and a second arrow 12, and the second UE 703 (peer device) is moving away (out of coverage of the D2D link) (symbolized in FIG. 16 with a third arrow 1602), the communication path may be switched back to the 'legacy' infrastructure assisted communication path (Uu interfaces 705) as fast as possible. This switch back is shown in FIG. 16 by means of a fourth arrow 21 and a fifth arrow 22.

In other words, in various aspects of this disclosure, a movement of the second UE 703 (target) out of coverage of the D2D communication link (via the Ud interface 704) may trigger a switch back to the legacy communication link via the base station 701 and e.g. via the Uu interfaces 705.

If RRC Connection Re-Establishment is still possible to re-activate the communication path over the two Uu air interfaces 705, it may be beneficial to include novel information elements (or parameters) also in the RRC Connection Reestablishment Request message as shown below (again in ASN.1 notation):

```
        -- ASN1START
    RRCConnectionReestablishmentRequest ::=         SEQUENCE {
    criticalExtensions              CHOICE {
    rrcConnectionReestablishmentRequest-r8
                                    RRCConnectionReestablishmentRequest-r8-IEs,
        criticalExtensionsFuture    SEQUENCE { }
        }
    }
    RRCConnectionReestablishmentRequest-r8-IEs ::= SEQUENCE {
        ue-Identity                 ReestabUE-Identity,
        reestablishmentCause        ReestablishmentCause,
        spare                       BIT STRING (SIZE (2))
    }
    ReestabUE-Identity ::=   SEQUENCE {
        c-RNTI                      C-RNTI,
        physCellId                  PhysCellId,
        shortMAC-I                  ShortMAC-I
    }
    ReestablishmentCause ::= ENUMERATED {
                                    reconfigurationFailure, handoverFailure, D2D-Failure,
otherFailure}
        -- ASN1STOP
```

Thus, a re-establishment cause may be provided with one additional field value, namely "D2D-Failure". Other names for this information element are also possible, such as "D2D-Session-Transfer-Failure" or "D2D-Problem", and the like.

The RRCConnectionReestablishmentRequest field descriptions are as follows:

PhysCellId: The Physical Cell Identity of the PCell the UE was connected to prior to the failure.

reestablishmentCause: Indicates the failure cause that triggered the re-establishment procedure.

ue-Identity: UE identity included to retrieve UE context and to facilitate contention resolution by lower layers.

In summary, three main building blocks have been provided in this disclosure:

Part I: Indication of a D2D related reason for attempts to set up an RRC connection (e.g., as part of the Random Access procedure).

Part II: Behaviour of the infrastructure after reception of the novel indication (e.g., new connection establishment cause), such as prioritizing or de-prioritizing UEs that are performing random access to an (e)NodeB;

selecting special resources for assignment to UEs that are engaged (or are about to engage) in D2D traffic (illustratively, the special resources may be "processing resources" on infrastructure side);

performing early UE context updates in data base (e.g., "UEx has detected D2D proximity") for session transfer from infrastructure mode to D2D mode of operation;

initiate early paging of other UEs for session transfer from D2D mode to infrastructure mode of operation;

requesting additional information from the UE, e.g.:

retrieve positioning data (detected in the course of the D2D proximity detection procedure), or retrieve auxiliary information about the type of service that was terminated or is about to be started (for instance, related to QoS for the direct UE-to-UE communication path).

Part III: Further Considerations for RRC Connection Re-Establishment.

Effects of various aspects of this disclosure may be the following:

Requests that relate to "D2D-Public-Safety" can be handled with high priority and therefore the reliability of network access in case of emergency can be increased.

Requests that relate to "D2D-Info-Available" or "D2D-Commercial" can be handled with lower priority and will therefore enable the network to prefer more important requests if required. This may lead to lower delay and higher reliability of requests with higher priority.

Requests that relate to D2D in general can be detected by the network easily and early. This may reduce delay and may avoid loss of data e.g. in case of "D2D Session Transfer".

Another effect may be that context updates of a UE or of a D2D cluster can be realized much earlier on network side compared to prior art. The conventional approach allows exchange of these pieces of information only after an RRC Connection was successfully established.

A radio communication terminal device may include a cellular wide area radio communication technology circuit configured to provide a communication according to a cellular wide area radio communication technology; a circuit configured to provide a direct communication device to communication device communication; and a message generator configured to generate a message comprising information of a direct communication device to communication device communication provided by the circuit.

The message may indicate a request to establish or re-establish a mobile radio communication connection. By way of example, the mobile radio communication connection may be a communication connection between the radio communication terminal device and a base station of the cellular wide area radio communication technology. The information of a direct communication device to communication device communication may include information of a reason for the request to establish or re-establish the mobile radio communication connection. The message may include a message field including the information of a direct communication device to communication device communication. The message may include a message field including information related to the reason of the request to establish or re-establish the mobile radio communication connection. The information related to the reason of the request to establish or re-establish the mobile radio communication connection may include an indication that the request to establish or re-establish the mobile radio communication connection is for a direct communication device to communication device communication. The information related to the reason of the request to establish or re-establish the mobile radio communication connection may include an indication that a direct communication device to communication device communication information is available in the radio communication terminal device. The information related to the reason of the request to establish or re-establish the mobile radio communication connection may include a request for a direct communication device to communication device communication control command. The information related to the reason of the request to establish or re-establish the mobile radio communication connection may include an indication that the request to establish or re-establish the mobile radio communication connection is for a direct communication device to communication device communication proximity detection. The information related to the reason of the request to establish or re-establish the mobile radio communication connection may include an indication that the request to establish or re-establish the mobile radio communication connection is for a direct communication device to communication device communication. The information related to the reason of the request to establish or re-establish the mobile radio communication connection may include an indication that the request to establish or re-establish the mobile radio communication connection is for a direct communication device to communication device communication public safety usage. The information related to the reason of the request to establish or re-establish the mobile radio communication connection may include an indication that the request to establish or re-establish the mobile radio communication connection is for a direct communication device to communication device communication commercial usage. The information related to the reason of the request to establish or re-establish the mobile radio communication connection may include an indication that the request to establish or re-establish the mobile radio communication connection is for a direct communication device to communication device communication session transfer. The message may be a network layer communication protocol message, e.g. a radio resource control protocol message. Furthermore, the circuit may be configured to provide the direct communication device to communication device communication with the second radio communication device according to information received by a radio base station. The circuit may further be configured to provide the direct communication device to communication device communication with the second radio communication device according to information received by an eNodeB. The cellular wide area radio communication technology circuit may be configured to provide a communication according to a Third Generation Partnership Project radio communication technology. The cellular wide area radio communication technology circuit may be configured to provide a communication according to a Long Term Evolution radio communication technology. The circuit may be configured to provide the direct communication device to communication device communication under a control of an entity of a cellular wide area radio communication network. Moreover, the radio communication device may further include a measurement circuit configured to measure a signal quality of signals of an established direct communication device to communication device communication connection with the second radio communication device.

A radio communication terminal device may include: a cellular wide area radio communication technology circuit configured to provide a communication according to a cellular wide area radio communication technology; a circuit configured to provide a direct communication device to communication device communication; a message generator configured to generate a cellular wide area radio communication technology message comprising information related to a direct communication device to communication device communication provided by the circuit; and a transmitter configured to transmit the generated message to a cellular wide area radio base station.

A cellular wide area radio base station may include: a receiver configured to receive a message from a first radio communication device, the message comprising information of a direct communication device to communication device communication of the first radio communication device with a second radio communication device; a cellular wide area radio communication technology circuit configured to provide a communication with the first radio communication device according to a cellular wide area radio communication technology; and a controller configured to carry out a predefined process with respect to a direct communication device to communication device communication based on the message.

The cellular wide area radio base station may be configured as an eNodeB. The cellular wide area radio communication technology circuit may be configured to provide a communication according to a Third Generation Partnership Project radio communication technology. The cellular wide area radio base station may further include a classifying circuit configured to classify the received message based on the information of a direct communication device to communication device communication. The controller may further be configured to one of prioritize and de-prioritize the message over one or more other received messages based on classification of the message. Furthermore, the controller may be configured to retrieve information from at least one of the first radio communication device and a database.

Moreover, the controller may be configured to page another radio communication device. The message may indicate a request to establish or re-establish of a mobile radio communication connection. The information of a direct communication device to communication device communication may include information of a reason for the request to establish or re-establish the mobile radio communication connection. The message may include a message field including the information of a direct communication device to communication device communication. The message may include a message field including the information related to the reason of the request to establish or re-establish the mobile radio communication connection. The information related to the reason of the request to establish or re-establish the mobile radio communication connection may include an indication that the request to establish or re-establish the mobile radio communication connection is for (e.g. related to) a direct communication device to communication device communication. The information related to the reason of the request to establish or re-establish the mobile radio communication connection may include an indication that a direct communication device to communication device communication information is available in the radio communication terminal device. The information related to the reason of the request to establish or re-establish the mobile radio communication connection may include a request for a direct communication device to communication device communication control command. The information related to the reason of the request to establish or re-establish the mobile radio communication connection may include an indication that the request to establish or re-establish the mobile radio communication connection is for a direct communication device to communication device communication proximity detection. The information related to the reason of the request to establish or re-establish the mobile radio communication connection may include an indication that the request to establish or re-establish the mobile radio communication connection is for a direct communication device to communication device communication. The information related to the reason of the request to establish or re-establish the mobile radio communication connection may include an indication that the request to establish or re-establish the mobile radio communication connection is for a direct communication device to communication device communication public safety usage. The information related to the reason of the request to establish or re-establish the mobile radio communication connection may include an indication that the request to establish or re-establish the mobile radio communication connection is for a direct communication device to communication device communication commercial usage. The information related to the reason of the request to establish or re-establish the mobile radio communication connection may include an indication that the request to establish or re-establish the mobile radio communication connection is for a direct communication device to communication device communication session transfer. The message may be a network layer communication protocol message. The network layer communication protocol message may be a radio resource control protocol message. The controller may be configured to control the direct communication device to communication device communication of the first radio communication device with the second radio communication device. The cellular wide area radio communication technology circuit may be configured to provide a communication according to a Third Generation Partnership Project radio communication technology. The cellular wide area radio communication technology circuit may be configured to provide a communication according to a Long Term Evolution radio communication technology.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication terminal device, comprising:
a cellular wide area radio communication technology circuit to provide a communication according to a cellular wide area radio communication technology;
a device-to-device (D2D) communication technology circuit to provide a direct communication device to communication device communication; and
a message generator to generate a message to include information to indicate that a radio resource control (RRC) connection that is to be established based on the message is related to a direct communication device to communication device communication of the D2D communication technology circuit and to cause the cellular wide area radio communication technology circuit to transmit the message to an eNB, wherein the message is an RRC connection request message or a random access request message, wherein the message is an RRC connection request message to request to establish a mobile radio communication connection with the eNB and the message comprises a message field including information of at least one of plural reasons for the request to establish the mobile radio communication connection, wherein at least one of the plural reasons includes to provide information about an ongoing direct communication device to communication device communication of the radio communication terminal device and at least a second one of the plural reasons provides information indicating a precedence for handling of the RRC connection request message by the eNB relative to one or more other RRC connection request messages relating to D2D communication.

2. The radio communication terminal device of claim 1, wherein the message is a random access request message.

3. The radio communication terminal device of claim 1, wherein the message comprises a message field including the information of a direct communication device to communication device communication.

4. The radio communication terminal device of claim 1, wherein the information comprises an indication that a direct communication device to communication device communication information is available in the radio communication terminal device.

5. The radio communication terminal device of claim 1, wherein the information comprises a request for a direct communication device to communication device communication control command.

6. The radio communication terminal device of claim 1, wherein the information comprises an indication that the RRC connection is for a direct communication device to communication device communication proximity detection.

7. The radio communication terminal device of claim 1, wherein the information comprises an indication that the RRC connection is for a direct communication device to communication device communication.

8. The radio communication terminal device of claim 1, wherein the information comprises an indication that the RRC connection is for a direct communication device to communication device communication public safety usage.

9. The radio communication terminal device of claim 1, wherein the information comprises an indication that the RRC connection is for a direct communication device to communication device communication commercial usage.

10. The radio communication terminal device of claim 1, wherein the information comprises an indication that the RRC connection is for a direct communication device to communication device communication session transfer.

11. The radio communication terminal device of claim 1, wherein the message is a network layer communication protocol message.

12. The radio communication device of claim 1, further comprising: a measurement circuit configured to measure a signal quality of signals of an established communication device to communication device communication connection with the second radio communication device.

13. One or more non-transitory, computer readable media having instructions that, when executed, cause a UE to:
generate a message to include information to indicate that a radio resource control (RRC) connection that is to be established based on the message is related to a direct communication device to communication device communication of a device-to-device (D2D) communication technology circuit of the UE, wherein the message is an RRC connection request message to request to establish a mobile radio communication connection with the eNB and the message comprises a message field including information of at least one of multiple reasons for the request to establish the mobile radio communication connection, wherein at least one of the plural reasons includes to provide information about an ongoing direct communication device to communication device communication of the UE and at least a second one of the plural reasons provides information indicating a precedence for handling of the RRC connection request message by the eNB relative to one or more other RRC connection request messages relating to D2D communication; and
transmit the message to an eNB using a cellular wide area radio communication technology circuit of the UE.

14. The one or more non-transitory, computer-readable media of claim 13, wherein the message includes a random access request message.

15. The one or more non-transitory, computer-readable media of claim 13, wherein the information comprises: an indication that a direct communication device to communication device communication information is available in the radio communication terminal device; a request for a direct communication device to communication device communication control command; an indication that the RRC connection is for a direct communication device to communication device communication proximity detection; an indication that the RRC connection is for a direct communication device to communication device communication; an indication that the RRC connection is for a direct communication device to communication device communication public safety usage; or an indication that the RRC connection is for a direct communication device to communication device communication commercial usage.

* * * * *